US009331946B2

(12) United States Patent
Okita

(10) Patent No.: US 9,331,946 B2
(45) Date of Patent: May 3, 2016

(54) METHOD AND APPARATUS TO DISTRIBUTE DATA CENTER NETWORK TRAFFIC

(71) Applicant: Hideki Okita, Sunnyvale, CA (US)

(72) Inventor: Hideki Okita, Sunnyvale, CA (US)

(73) Assignee: HITACHI, LTD., Tokyo (JP)

( * ) Notice: Subject to any disclaimer, the term of this patent is extended or adjusted under 35 U.S.C. 154(b) by 308 days.

(21) Appl. No.: 13/736,243

(22) Filed: Jan. 8, 2013

(65) Prior Publication Data
US 2014/0195695 A1 Jul. 10, 2014

(51) Int. Cl.
H04L 12/803 (2013.01)
H04L 12/709 (2013.01)
H04L 12/743 (2013.01)
H04L 29/12 (2006.01)

(52) U.S. Cl.
CPC ............ H04L 47/125 (2013.01); H04L 45/245 (2013.01); H04L 45/7453 (2013.01); H04L 61/103 (2013.01); H04L 61/2069 (2013.01); Y02B 60/33 (2013.01)

(58) Field of Classification Search
CPC ......... H04L 45/00; H04L 45/22; H04L 45/28; H04L 29/14; H04L 47/125
USPC .......................................................... 709/239
See application file for complete search history.

(56) References Cited

U.S. PATENT DOCUMENTS 6,859,842 B1 * 2/2005 Nakamichi ............. H04L 45/00 709/238
7,903,654 B2 3/2011 Bansal et al.
2005/0018682 A1 * 1/2005 Ferguson et al. ............. 370/392
2009/0154454 A1 * 6/2009 Wittenschlaeger ........... 370/389
2010/0135308 A1 * 6/2010 Lee et al. ...................... 370/401
2011/0096789 A1 * 4/2011 Lin ...................... H04L 67/1002 370/401
2011/0216769 A1 * 9/2011 Lakshmanan et al. ........ 370/392
2012/0287791 A1 * 11/2012 Xi ........................ H04L 43/0882 370/237
2014/0050223 A1 * 2/2014 Foo ...................... H04L 47/2441 370/400

OTHER PUBLICATIONS

Title: VXLAN: A Framework for Overlaying Virtualized Layer 2 Networks over Layer 3 Networks Author: Internet Engineering Task Force (IETF); M.Mahalingam, VMware, D.Dutt, K.Duda, Arista, P.Agarwal, Broadcom, L. Kreeger, Cisco, T. Sridhar, VMware, M.Bursell, Citrix, C.Wright, Red Hat Date: Feb. 2012.*
E. Rosen et al., Multiprotocol Label Switching Structure, Jan. 2001, Internet Engineering Task Force, RC 3031, pp. 4-8.*

* cited by examiner

Primary Examiner — Oleg Survillo
Assistant Examiner — Christopher Cadorna
(74) Attorney, Agent, or Firm — Mattingly & Malur, PC

(57) ABSTRACT

Exemplary embodiments provide a technique to improve the system availability of the systems that have multiple links and are connected to a network fabric. In one embodiment, a switch comprises: a memory storing a first logical group which has a first plurality of IP addresses of a first plurality of ports and is assigned to a first ID (identifier), and a second logical group which has a second plurality of IP addresses of a second plurality of ports and is assigned to a second ID; and a controller controlling to cause a logical path of the first logical group to use a first physical path which is different from a second physical path to be used by a logical path of the second logical group, based on the first ID and the second ID.

20 Claims, 32 Drawing Sheets

Distribution configuration

| Port ID | Aggregation ID | |
|---|---|---|
| 1/1 | | ∽708 |
| 1/2 | | ∽801 |
| 1/3 | 1 | ∽802 |
| 1/4 | 1 | ∽803 |
| 1/5 | 1 | ∽804 |
| 1/6 | 1 | ∽805 |
| | | ∽805 |

Fig. 8

System information

| Hostname | IP Address | System ID | |
|---|---|---|---|
| Web1 | 192.168.1.201 | 101 | 901 |
| Web2 | 192.168.1.202 | 102 | 902 |
| App1 | 192.168.1.1 | 101 | 903 |
| App2 | 192.168.1.2 | 102 | 904 |
| Iscsi1 | 192.168.1.101 | 101 | 905 |
| Iscsi2 | 192.168.1.102 | 102 | 905 |
| | | | |

Distribution configuration

| Port ID | Aggregation ID | |
|---|---|---|
| 1/1 | | ~1101 |
| 1/2 | | ~1102 |
| 1/3 | 10 | ~1103 |
| 1/4 | 10 | ~1104 |
| 1/5 | 10 | ~1105 |
| 1/6 | 10 | ~1106 |
| | | |

System information

| IP Address | System ID | |
|---|---|---|
| 192.168.1.201 | 101 | ~1201 |
| 192.168.1.202 | 102 | ~1202 |
| 192.168.1.1 | 101 | ~1203 |
| 192.168.1.2 | 102 | ~1204 |
| 192.168.1.101 | 101 | ~1205 |
| 192.168.1.102 | 102 | ~1206 |
|  |  | |

(table ref: ~1010)

Fig. 12

Distributed route information

System information
(VLAN/system ID mapping) ∕∕1803

| VLAN Name | VLAN ID | System ID | |
|---|---|---|---|
| VLAN11 | 11 | 101 | ∕∕1901 |
| VLAN12 | 12 | 102 | ∕∕1902 |
| VLAN21 | 21 | 101 | ∕∕1903 |
| VLAN22 | 22 | 102 | ∕∕1904 |
|  |  |  | |

Fig. 19

System information

| VLAN ID | System ID | |
|---|---|---|
| 11 | 101 | ∼2101 |
| 12 | 102 | ∼2102 |
| 21 | 101 | ∼2103 |
| 22 | 102 | ∼2104 |
| | | |

System information
(VXLAN/system ID mapping)

| VXLAN Name | VNI | System ID |
|---|---|---|
| VXLAN11 | 11 | 101 |
| VXLAN12 | 12 | 102 |
| VXLAN21 | 21 | 101 |
| VXLAN22 | 22 | 102 |
|  |  |  |

Fig. 27

System information

| VNI | System ID | |
|---|---|---|
| 11 | 101 | ∿2802 ∿2901 |
| 12 | 102 | ∿2902 |
| 21 | 101 | ∿2903 |
| 22 | 102 | ∿2904 |
| | | |

Fig. 29

METHOD AND APPARATUS TO DISTRIBUTE DATA CENTER NETWORK TRAFFIC

BACKGROUND OF THE INVENTION

The present invention relates generally to Data Center (DC) network system and, more particularly, to a method and an apparatus to distribute network traffic to multiple paths in a network fabric.

In recent years, in data centers of cloud services, the use of network fabrics is increasing to deal with increasing horizontal traffics among servers and storages in the data centers. The demand for rapid change of configuration and capacity is also driving the use of the network fabrics.

The network fabric has typically multiple paths between two nodes in a fabric to provide a load balancing feature and to improve fault tolerance of the network. A node in that has multiple outgoing ports distribute automatically incoming network traffics according to a rule. For example, in a fabric with symmetric topology, when an edge of the fabric receives an IP packet, it makes hash values from the set of the source IP address and the destination IP address of the received packet. The hash values have the same hash length with the number of the multiple paths in the fabric. Mapping the hash values with the multiple paths, the edge node transfers the packet via the corresponding path to the made hash value. In general, the number of the set of the addresses is larger than the number of the multiple paths. Therefore, the network traffics are distributed well randomly to the multiple paths.

However, a failure in a network fabric affects strongly network traffics that are randomly distributed to multiple paths in the fabric. In more detail, the failure affects multiple tenants using the fabric. As an example, we suppose the case of a Web system composed of a Web server, an application server, and an iSCSI target connected sequentially by the fabric. The Web system contains two network links. These two links could be distributed to the multiple paths of the fabric. When two Web systems are connected to and overwrapped on the fabric, one link failure can affect both of the two Web systems even if two links of a system are distributed to the multiple links. For example, as shown in FIG. 1, a link between a Web server and an application server of a Web system and a link between an application server and an iSCSI target of the other Web system can be assigned to the same physical link. Because each of the Web systems is affected even by a single-link failure, both of two tenants of the Web systems suffer a system failure and reduced system availability as shown in FIG. 2. As the complexity of tenant systems increases, the number of tenants affected by a link failure increases.

U.S. Pat. No. 7,903,654 B2 provides a packet classifier and a method for routing a data packet. It discloses load sharing with the routes under Equal Cost Multi Paths (ECMPs) and, more specifically, a method of hardware support for ECMP by an indirect coupling between Content Addressable Memory (CAM) and Parameter Random Access Memory (PRAM). It does not address the issues regarding system level availability of the present invention.

BRIEF SUMMARY OF THE INVENTION

Exemplary embodiments of the invention provide a technique to improve the system availability of the systems that have multiple links and are connected to a network fabric. A network fabric system is composed of a network manager and multiple network switches distributing incoming network packets to the multiple connected network switches and has one or more of the following features. The network manager manages memberships of systems, each of which is composed of one or multiple end nodes connected to the network fabric. The network manager also updates the system information according to its administrators' configuration via its management interfaces. The network manager also applies the system information to network switches that stand on the edge of the network fabric and that receive network packets from the above end nodes. The edge network switches distribute the received network packets to multiple paths in the network fabric according to the above system information.

The first embodiment of the present invention is a network fabric system that manages the system's membership according to IP addresses of end nodes connected to the network fabric. The second embodiment is a network fabric system that manages the system's membership according to Virtual LAN (VLAN) ID. The third embodiment of the present invention is a network fabric system that manages the system's membership according to Virtual eXtensible LAN (VXLAN) ID. The network manager configures virtual switches running to apply VLAN ID to VXLAN packets.

In accordance with an aspect of the present invention, a switch comprises: a memory storing a first logical group which has a first plurality of IP addresses of a first plurality of ports and is assigned to a first ID (identifier), and a second logical group which has a second plurality of IP addresses of a second plurality of ports and is assigned to a second ID; and a controller controlling to cause a logical path of the first logical group to use a first physical path which is different from a second physical path to be used by a logical path of the second logical group, based on the first ID and the second ID.

In some embodiments, the first logical group is assigned to the first ID by correlating the IP addresses of the first plurality of ports in the first logical group with the first ID; and the second logical group is assigned to the second ID by correlating the IP addresses of the second plurality of ports in the second logical group with the second ID. The controller is configured, for each packet received, to: read a source IP address of the received packet; if the source IP address matches an IP address of the first plurality of ports or the second plurality of ports, determine whether the source IP address is assigned to the first ID or the second ID; if the source IP address is assigned to the first ID, determine an outgoing port for the packet based on the first physical path; and if the source IP address is assigned to the second ID, determine an outgoing port for the packet based on the second physical path; and if the source IP address does not match an IP address of the first plurality of ports and the second plurality of ports, read a destination IP address of the received packet, and determine whether the destination IP address matches an IP address of the first plurality of ports or the second plurality of ports; if the destination IP address matches an IP address of the first plurality of ports or the second plurality of ports, determine whether the destination IP address is assigned to the first ID or the second ID; if the destination IP address is assigned to the first ID, determine an outgoing port for the packet based on the first physical path; and if the destination IP address is assigned to the second ID, determine an outgoing port for the packet based on the second physical path; and if the destination IP address does not match an IP address of the first plurality of ports and the second plurality of ports, calculate a hash value of the source IP address and the destination IP address of the packet, and select an outgoing port according to an order of the hash value based on a correlation between order of hash values and order of paths through a network fabric.

In specific embodiments, the first logical group is assigned to the first ID by correlating VLAN (Virtual Logical Area Network) IDs of the first plurality of ports in the first logical group with the first ID; and the second logical group is assigned to the second ID by correlating VLAN IDs of the second plurality of ports in the second logical group with the second ID. The controller is configured, for each packet received, to: read a VLAN ID of the received packet; if the VLAN ID of the received packet matches a VLAN ID of the first plurality of ports or the second plurality of ports, determine whether the VLAN ID is assigned to the first ID or the second ID; if the VLAN ID is assigned to the first ID, determine an outgoing port for the packet based on the first physical path; and if the VLAN ID is assigned to the second ID, determine an outgoing port for the packet based on the second physical path; and if the VLAN ID does not match a VLAN ID of the first plurality of ports and the second plurality of ports, calculate a hash value of the VLAN ID of the packet and select an outgoing port according to an order of the hash value based on a correlation between order of hash values and order of paths through a network fabric.

In some embodiments, the first logical group is assigned to the first ID by correlating VNIs (VXLAN (Virtual eXtensible LAN) Network Identifiers) of the first plurality of ports in the first logical group with the first ID; and the second logical group is assigned to the second ID by correlating VNIs of the second plurality of ports in the second logical group with the second ID. The controller is configured, for each packet received, to: read a VNI of the received packet; if the VNI of the received packet matches a VNI of the first plurality of ports or the second plurality of ports, determine whether the VNI is assigned to the first ID or the second ID; if the VNI is assigned to the first ID, determine an outgoing port for the packet based on the first physical path; and if the VNI is assigned to the second ID, determine an outgoing port for the packet based on the second physical path; and if the VNI does not match a VNI of the first plurality of ports and the second plurality of ports, calculate a hash value of the VNI of the packet and select an outgoing port according to an order of the hash value based on a correlation between order of hash values and order of paths through a network fabric.

Another aspect of the invention is directed to a computer-readable storage medium storing a plurality of instructions for controlling a data processor to manage network traffic. The plurality of instructions comprise: instructions that cause the data processor to store, in a memory, a first logical group which has a first plurality of IP addresses of a first plurality of ports and is assigned to a first ID (identifier), and a second logical group which has a second plurality of IP addresses of a second plurality of ports and is assigned to a second ID; and instructions that cause the data processor to control to cause a logical path of the first logical group to use a first physical path which is different from a second physical path to be used by a logical path of the second logical group, based on the first ID and the second ID.

Another aspect of this invention is directed to a method of controlling network traffic using a switch that includes a memory and a controller. The method comprises: storing, in the memory, a first logical group which has a first plurality of IP addresses of a first plurality of ports and is assigned to a first ID (identifier), and a second logical group which has a second plurality of IP addresses of a second plurality of ports and is assigned to a second ID; and controlling to cause a logical path of the first logical group to use a first physical path which is different from a second physical path to be used by a logical path of the second logical group, based on the first ID and the second ID.

These and other features and advantages of the present invention will become apparent to those of ordinary skill in the art in view of the following detailed description of the specific embodiments.

BRIEF DESCRIPTION OF THE DRAWINGS

FIG. 8 shows an example of the distribution configuration of the network manager.

FIG. 9 shows an example of the system information of the network manager.

FIG. 11 shows an example of the distribution configuration in the port switch.

FIG. 12 shows an example of the system information in the port switch.

FIG. 19 shows an example of the system information (VLAN/system ID mapping) used by the network manager according to the second embodiment.

FIG. 21 shows an example of the system information of the second embodiment.

FIG. 27 shows an example of the system information (VXLAN/system ID mapping) used by the network manager according to the third embodiment.

FIG. 29 shows an example of the system information of the third embodiment.

DETAILED DESCRIPTION OF THE INVENTION

Figure 1:
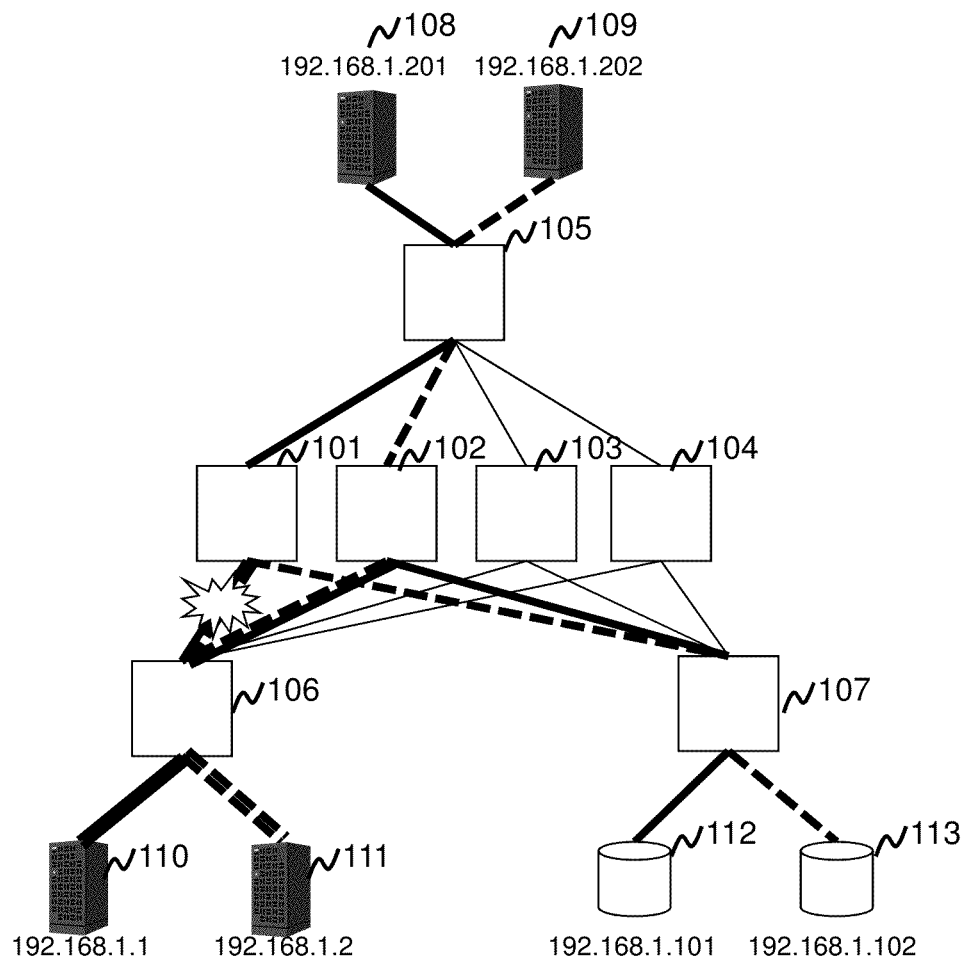
FIG. 1 shows an example of a network of the prior network fabric system.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium including non-transient medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for distributing network traffic to multiple paths in a network fabric. More specifically, embodiments of the present invention provide a network fabric system that manages the system information composed of a set of an identity of end node and an identity of a group of one or multiple end nodes, and at the entrance of the network fabric providing multiple paths, select an appropriate path for each packet so as to transfer the packets of a system to the same path.

First Embodiment

IP Address Based Mapping

FIG. 1 shows an example of a network of the prior network fabric system. It includes four fabric switches 101-104, three port switches 105-107, two Web servers 108 and 109, two application servers 110 and 111, and two iSCSI targets 112 and 113. The Web servers 108 and 109, the application servers 110 and 111, and the iSCSI targets 112 and 113 are end nodes of the network fabric system. The port switches 105-107 distribute packets received from the end nodes to the fabric switches 101-104. For each packet, the port switch decides the next forwarded fabric switch according to the set of source IP address and the destination IP address of the received packet. When the number of end nodes is larger than the number of multiple paths, multiple traffics are naturally overwrapped to a single link. It can cause multiple tenants to use the same link and that they are affected by a single-link failure.

Figure 2:
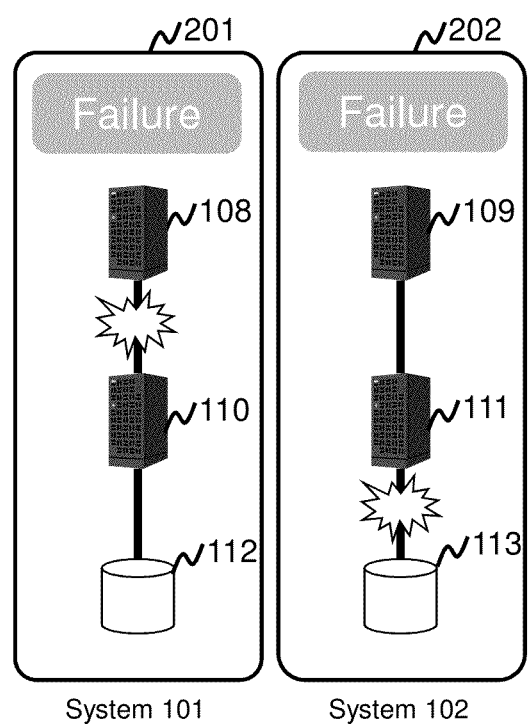
FIG. 2 shows an example of a logical view of the systems in the network fabric system of FIG. 1.

FIG. 2 shows an example of a logical view of the systems in the network fabric system of FIG. 1. The Web server 108, the application server 110, and the iSCSI target 112 compose a system 201. Also, the Web server 109, the application server 111, and the iSCSI target 113 compose a system 202. In this case, a single link failure affects one logical link in each of the two systems.

Figure 3:
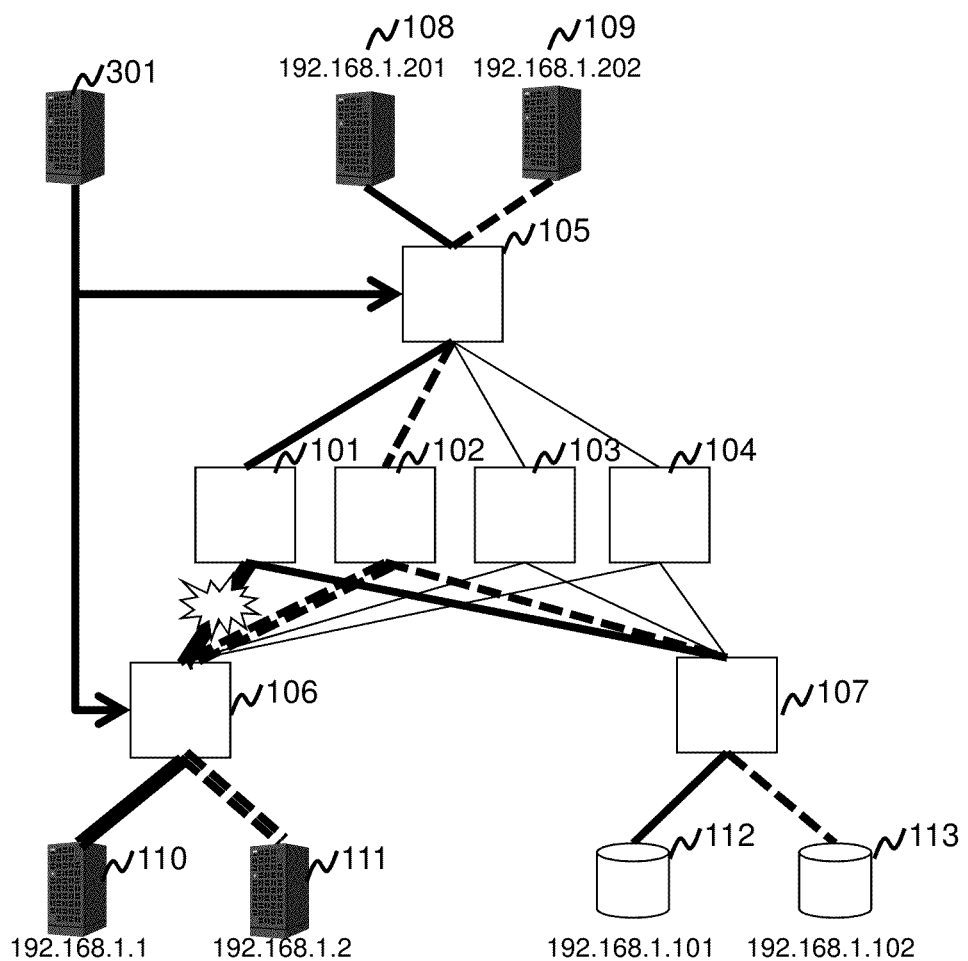
FIG. 3 shows an example of a network topology of the network fabric system according to a first embodiment of the present invention.

FIG. 3 shows an example of a network topology of the network fabric system according to a first embodiment of the present invention. In addition to the switches and end nodes in the prior network fabric system, it includes a network manager 301 that controls port switches 105-107. This network fabric system controls routes of the network traffics transferred in the network fabric so as to aggregate traffics of the same system as much as possible. In this case, contrary to the prior network fabric system, the single link between the fabric switch 101 and the port switch 106 transfers both of the Web-App traffic and the App-iSCSI traffic.

Figure 4:
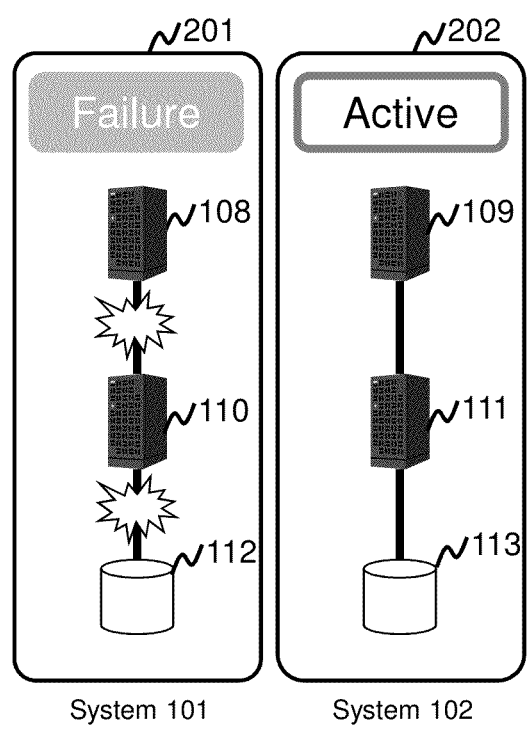
FIG. 4 shows an example of a logical view of the systems in the network fabric system of FIG. 3.

FIG. 4 shows an example of a logical view of the systems in the network fabric system of FIG. 3. When the link failure occurs on the link between the fabric switch 101 and the port switch 106, it affects only the system 201 in this case. Compared to the prior network fabric system's case (FIG. 2), roughly speaking, the number of affected systems is reduced by half.

Figure 5:
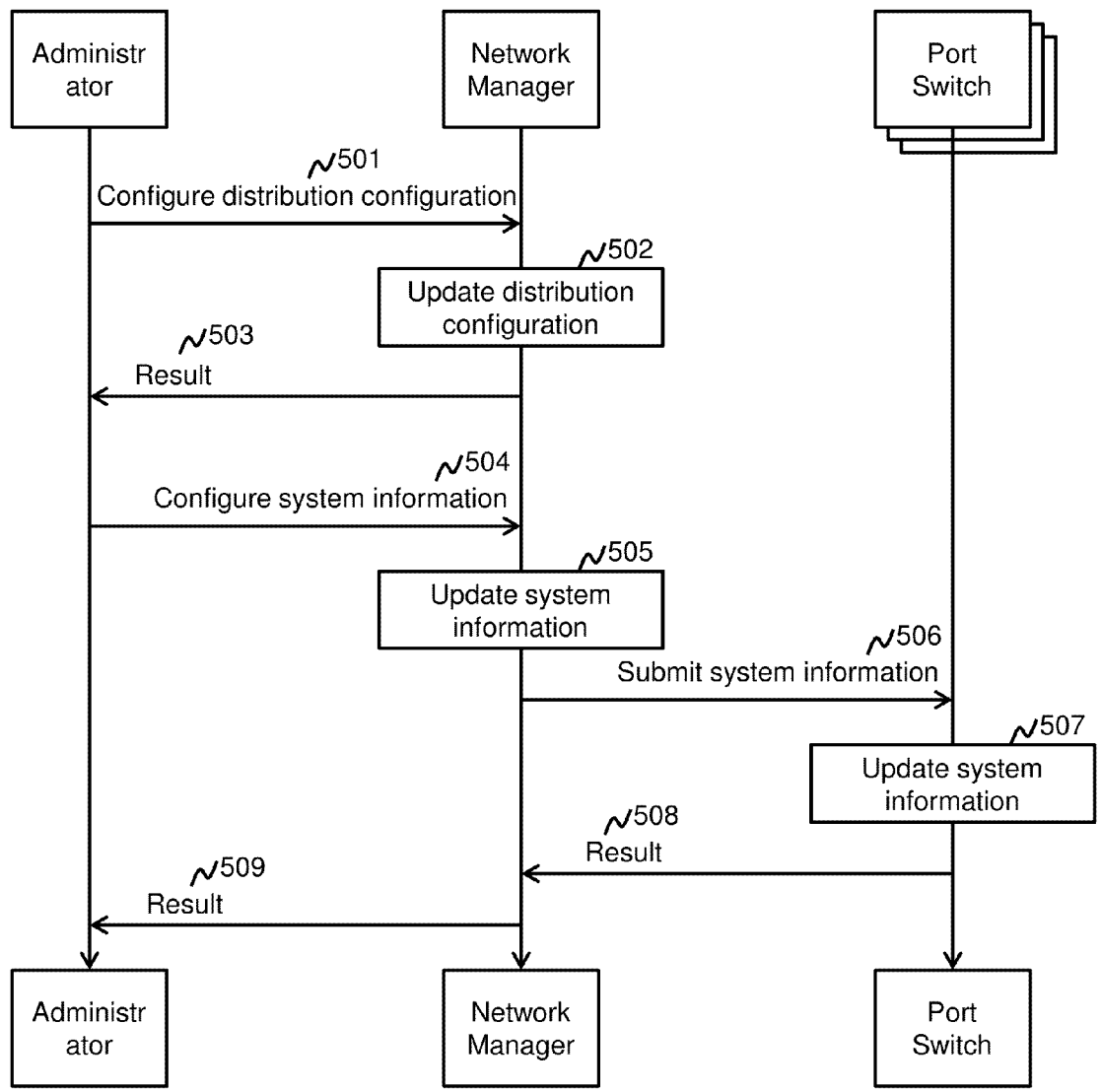
FIG. 5 shows an example of a message sequence of the network fabric system according to the first embodiment.

FIG. 5 shows an example of a message sequence of the network fabric system according to the first embodiment. First, an administrator of the network fabric system configures the distribution configuration stored in the network manager 301 via a user interface such as Web GUI (Graphical User Interface), command line interface (CLI), and RESTful API (step 501). Then the network manager 301 updates the distribution configuration (step 502) and returns its result (step 503). The administrator configures system information, which represents the membership of end nodes to the systems composed of one or multiple end nodes (step 504). The network manager 301 updates the system information (step 505) and submits the system information to the port switches 105-107 (step 506). The port switches receive the system information and apply it to their own data store (step 507) and return results (step 508). The network manager 301 receives the results and returns a result to the administrator (step 509).

Figure 6:
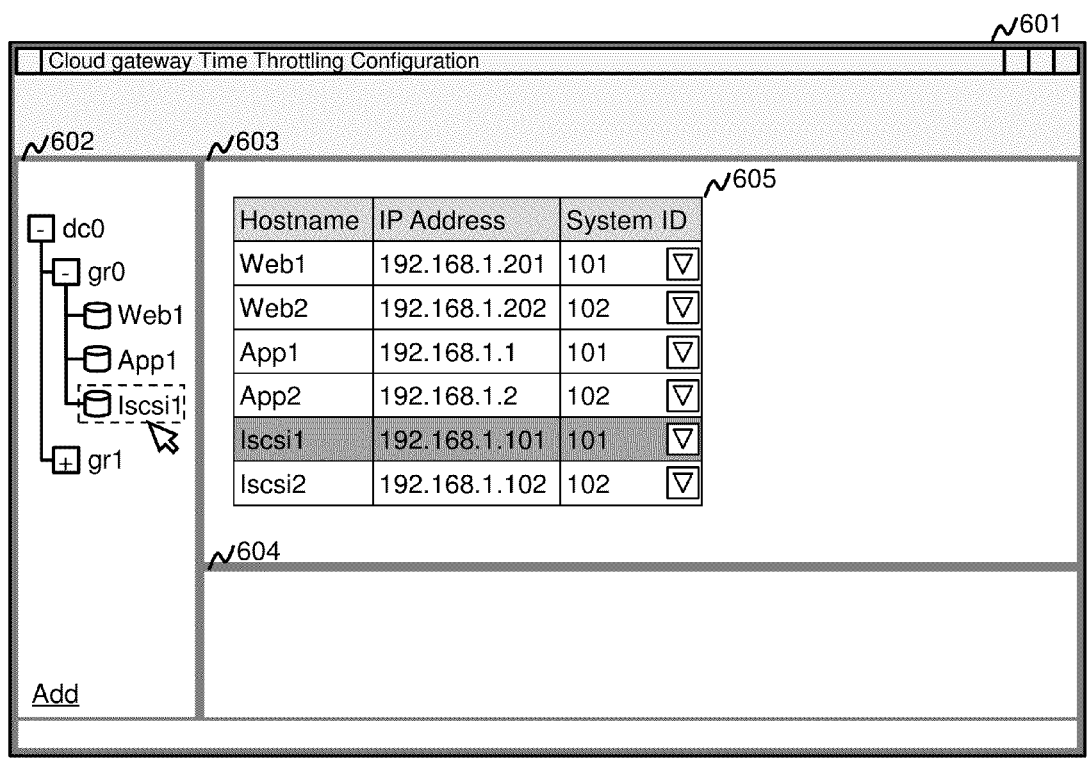
FIG. 6 shows an example of a GUI of the network manager.

FIG. 6 shows an example of a GUI of the network manager 301. It is a window 601 and includes an end-node tree pane 602, a system ID configuration pane 603, a detailed information pane 604, and a system information configuration table 605. On the system information configuration table 605, the administrator selects an existing system ID or enters a new system ID for each end node.

Figure 7:
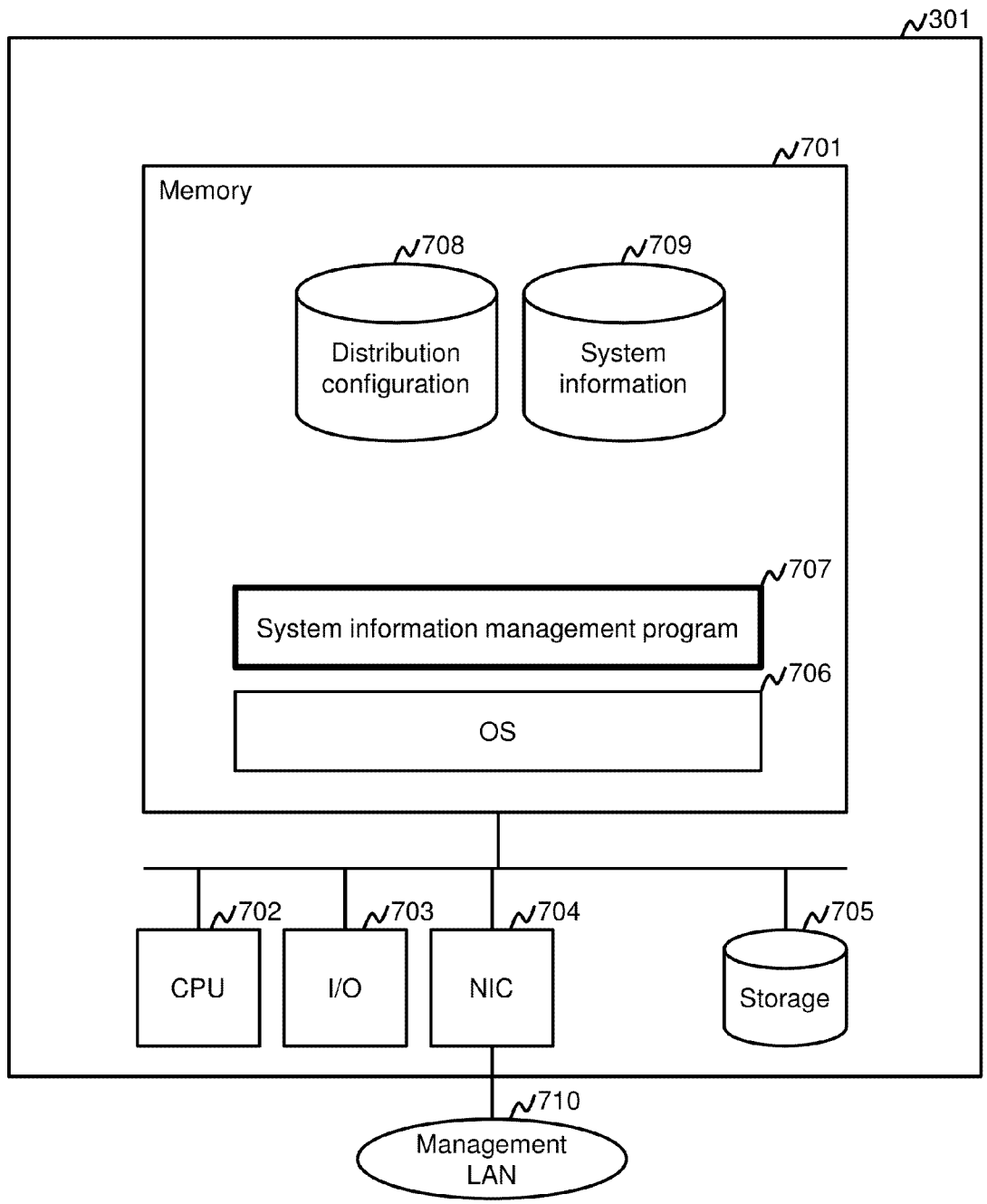
FIG. 7 shows an example of hardware and software architecture of the network manager.

FIG. 7 shows an example of hardware and software architecture of the network manager 301. As featured functions, it stores distribution information 708 and system information 709 on its memory 701. The memory 701 also has a system information management program 707 and an operating system (OS) 706. The memory 701 is coupled via an internal bus to CPU 702, I/O 703, NIC (Network Interface Card) 704, and storage 705. The NIC 704 is coupled to a management LAN (Local Area Network) 710.

FIG. 8 shows an example of the distribution configuration 708 of the network manager 301. It is implemented as a table each entry of which is composed of a port ID and an aggregation ID. Each entry (801-805) of this table represents a configuration status of each network port of a port switch. In this example, ports 1/3-1/6 are configured as members of a logical aggregation interface with the ID 1.

FIG. 9 shows an example of the system information 709 of the network manager 301. It is implemented as a table each entry (901-905) of which is composed of a hostname, an IP address, and a system ID. The system ID is used to identify a group composed of one or multiple end nodes. In this example, three hosts with hostnames "Web 1," "App 1," and "Iscsi1" form a system with system ID "101." Also, "Web2," "App2," and "Iscsi2" form a system with system ID "102."

Figure 10:
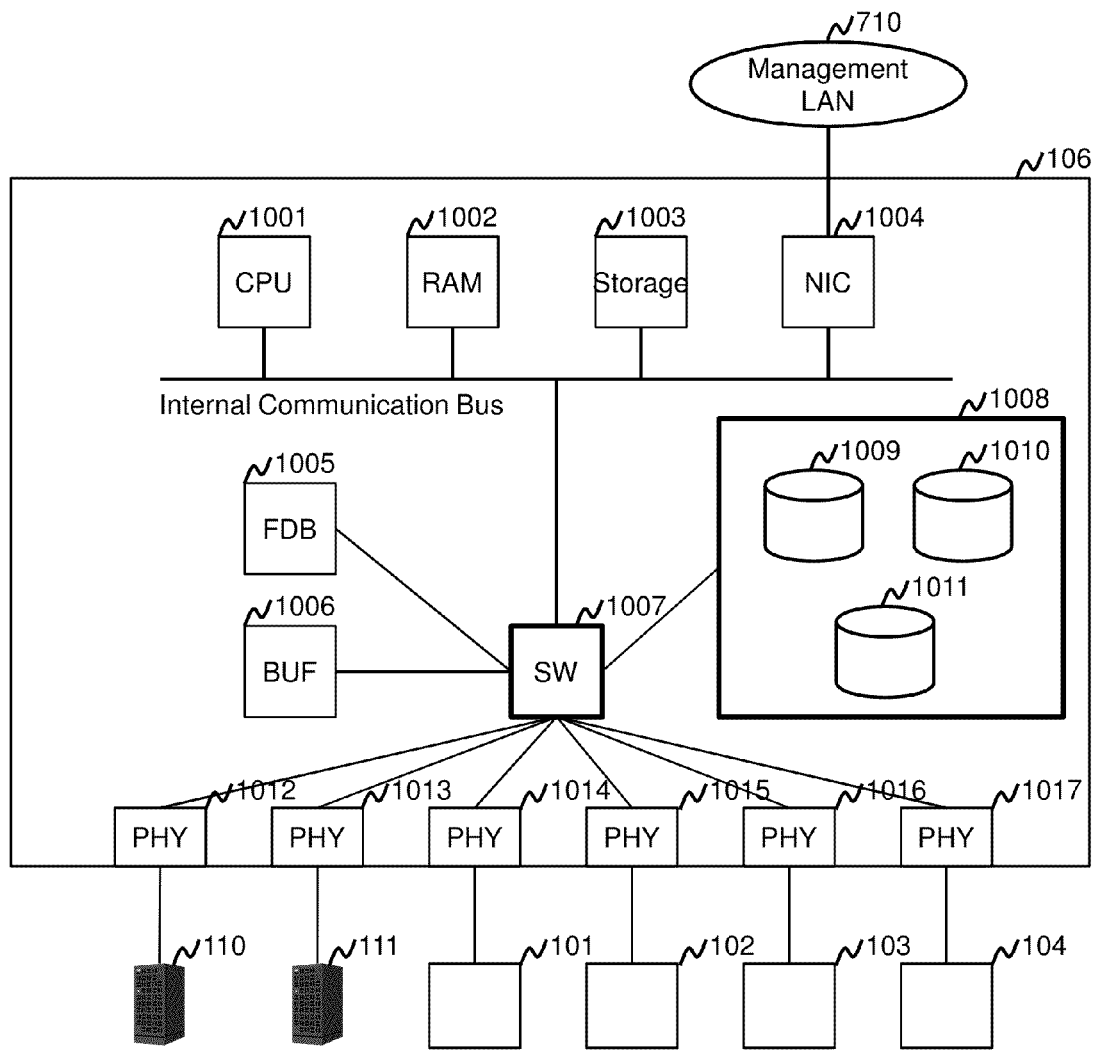
FIG. 10 shows an example of the block diagram of the port switches according to the first embodiment.

FIG. 10 shows an example of the block diagram of the port switches 105-107 according to the first embodiment. It shows a CPU 1001, a RAM 1002, a storage device 1003, and a network interface card (NIC) 1004 connected to an internal communication bus. Also, a switch device 1007 is connected to the internal communication bus. The switch device 1007 connects a forwarding database (FDB) 1005, a packet buffer 1006, a memory 1008, and multiple PHY (Physical layer) devices 1012-1017. The memory 1008 contains a distribution configuration 1009, system information 1010, distributed route information 1011. The FDB 1005 and the packet buffer 1006 are the same devices as the ones that general layer 2 switches have.

FIG. 11 shows an example of the distribution configuration 1009 in the port switch. It is implemented as a table each entry of which is composed of a port ID and an aggregation ID. It has the same structure as the distribution configuration 708 stored in the network manager 301.

FIG. 12 shows an example of the system information 1010 in the port switch. It is implemented as a table each entry of which is composed of an IP address and a system ID. It is a subset of the system information 709 stored in the network manager 301.

Figure 13:
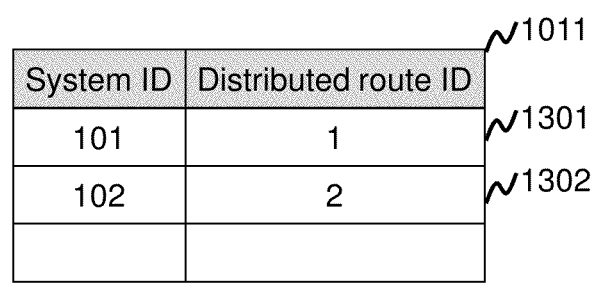
FIG. 13 shows an example of the distributed route information in the port switch.

FIG. 13 shows an example of the distributed route information 1011 in the port switch. It is implemented as a table each entry of which is composed of the system ID which identically appears in the system information 1010 and a distributed route ID which represent a specific path in the multiple paths of the network fabric. In this example, the distributed route ID "1" means paths using the fabric switch 101, and the distributed route ID "2" means paths using the fabric switch 102.

Figure 14:
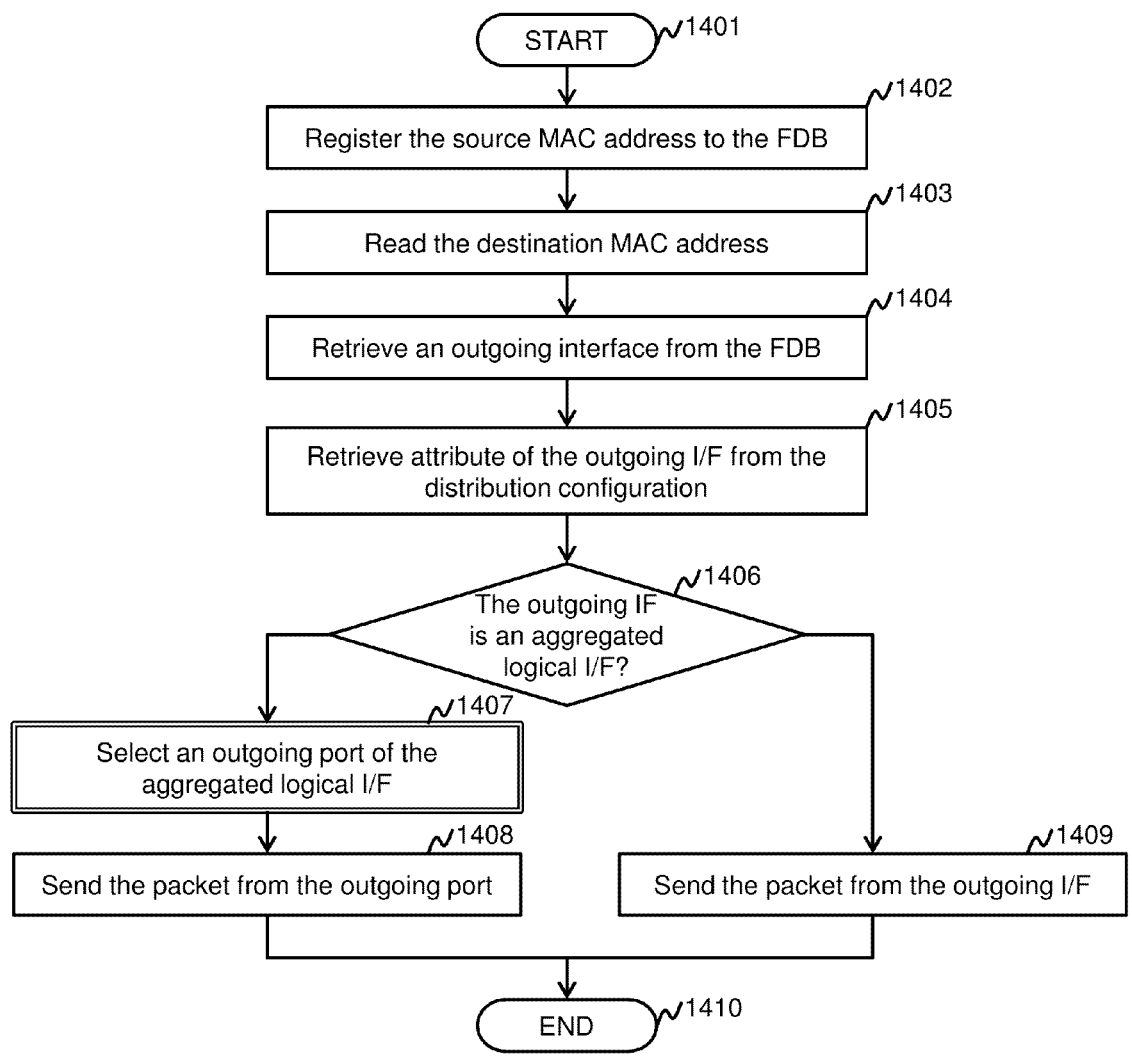
FIG. 14 shows an example of a flow diagram of the process of the switch device in the port switch.

FIG. 14 shows an example of a flow diagram of the process of the switch device 1007 in the port switch. The process starts at step 1401. Same with general switches, the switch device 1007 learns and registers the source MAC address of the received packets to the FDB 1005 (step 1402). It also reads the destination MAC address from the received packets (step 1403) and retrieves an outgoing interface corresponding to the destination MAC address from the FDB 1005 (step 1404). Steps 1402-1404 are the general processes of layer-2 switches.

The switch device 1007 retrieves an attribute of the outgoing interface from the distributed configuration 1009 (step 1405). It then checks if the outgoing interface is a member of an aggregated logical interface (step 1406). Actually, it defines the outgoing interface as the member if the aggregation ID column of the distribution configuration 1009 contains any integer value. If the checked outgoing interface is a member of an aggregated logical interface, the switch device 1007 starts to select an actual physical outgoing port in the aggregated logical interface (step 1407). The detail of this process is described later (see FIG. 15). After selecting the actual outgoing port, it sends the packet from the selected outgoing port (step 1408) and terminates the process regarding the received packet (step 1410). If the checked outgoing interface is not a member of an aggregated logical interface, the switch device 1007 sends the packet from the checked outgoing interface without additional process (step 1409) and terminates the process regarding the received packet (step 1410).

Figure 15:
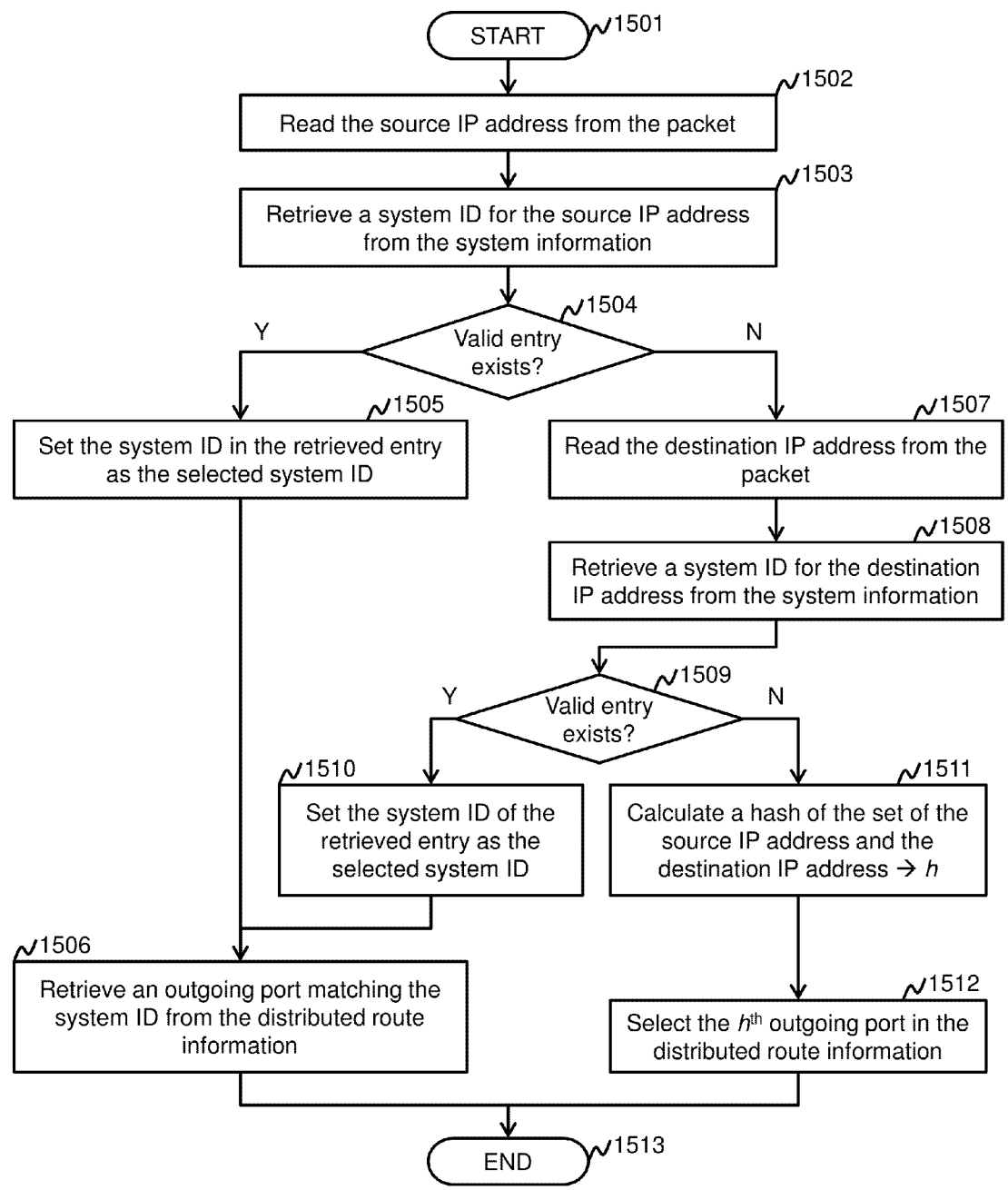
FIG. 15 shows an example of a flow diagram of process 1407 of the switch device in FIG. 14.

FIG. 15 shows an example of a flow diagram of the above described process 1407 of the switch device 1007 in FIG. 14. This flow diagram describes how to select an actual outgoing port from the member ports of an aggregated logical interface. The process starts at step 1501. The switch device 1007 reads the source IP address of the received packet (step 1502), and retrieves an entry matching the source IP address from the system information 1010 and tries to read the system ID in the retrieved entry (step 1503). It then checks if the valid entry exists in the system information 1010 (step 1504).

If a valid entry exists, the switch device sets the system ID in the retrieved entry as the selected system ID for the received packet (step 1505). It then retrieves a distributed route ID corresponding to the selected system ID from the distributed route information 1011 (step 1506). The distributed route ID represents the order of the selected fabric switch as described above. It directly corresponds to an outgoing port. If a valid entry does not exist, to select an outgoing port according to some other attributes, the switch device then reads the destination IP address from the received packet (step 1507) and retrieves a system ID corresponding to the destination IP address from the system information 1010 (step 1508). It then checks if the valid entry exists in the system information 1010 (step 1509).

If a valid entry exists in the system information 1010, it sets the system ID of the retrieved valid entry as the selected system ID (step 1510). Then it retrieves an outgoing port from the distributed route information (step 1506). It then ends the process of selecting an outgoing port (1513). If a valid entry does not exist in the system information 1010, it calculates a hash of the set of the source IP address and the destination IP address (step 1511) and selects an outgoing port according to an order of the hash value in the distributed route information 1011 (step 1512). It then ends the process of selecting an outgoing port (1513).

Second Embodiment

VLAN ID Based Mapping

Figure 16:
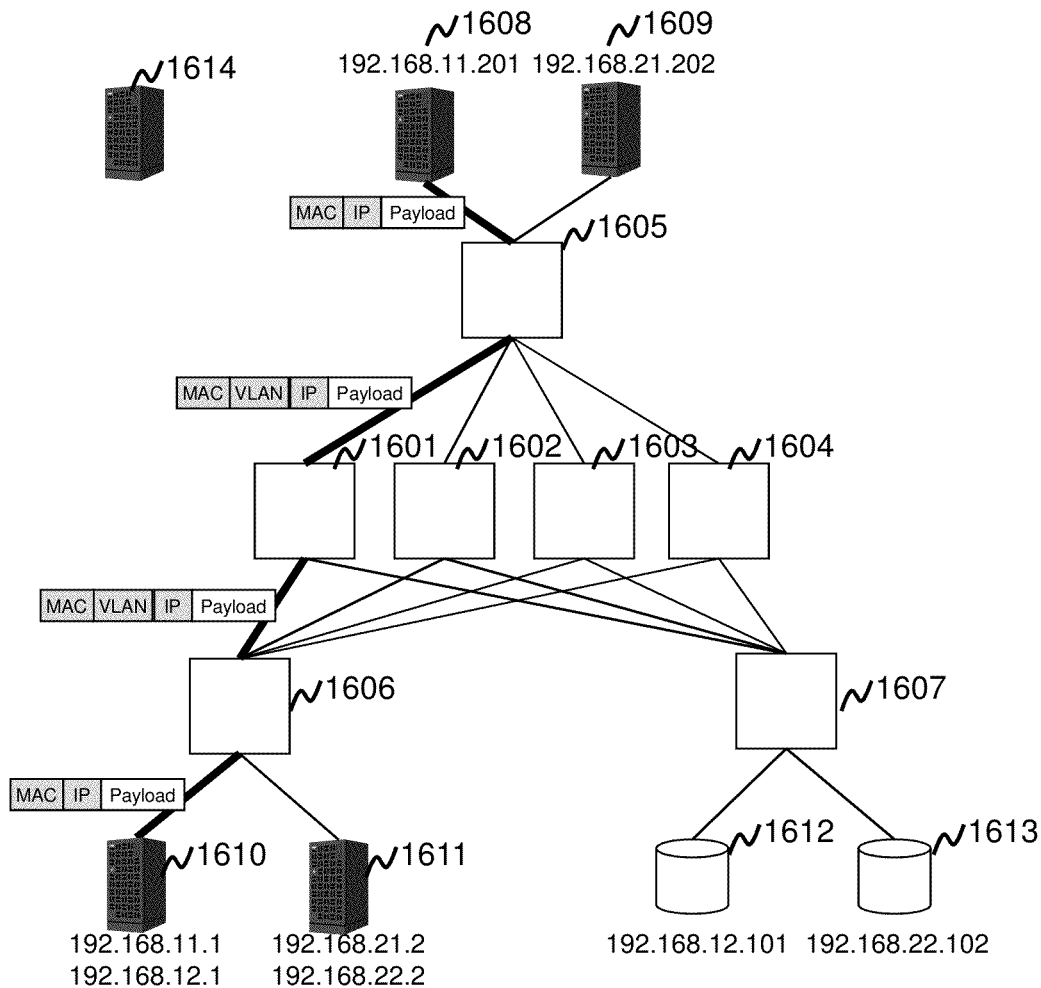
FIG. 16 shows an example of a network topology of the network fabric system according to a second embodiment of the present invention to illustrate an example of transferring packets in the network fabric system.

FIG. 16 shows an example of a network topology of the network fabric system according to a second embodiment of the present invention to illustrate an example of transferring packets in the network fabric system. It includes four fabric switches 1601-1604, three port switches 1605-1607, two Web servers 1608 and 1609, two application servers 1610 and 1611, and two iSCSI targets 1612 and 1613. The port switches 1605-1607 append VLAN tags to packets received from the end nodes and remove the VLAN tags when they transfer the packets to the end nodes according to their VLAN configurations.

In this case, with a prior method, to aggregate network traffics for each VLAN, the port switches select the destination fabric switch according to VLAN IDs in the VLAN tags. However, as same with the case of the selection according to IP addresses, multiple tenants could be affected by a single-link failure because each tenant might use multiple VLANs to form a system including multiple servers such as 3-tier Web systems. The network manager 1614 and port switches 1605-1607 of the second embodiment manage the mapping of VLAN IDs to system ID. The port switches 1605-1607 then forward selects an outgoing port and destination fabric switch according to the system ID instead of the VLAN IDs.

Figure 17:
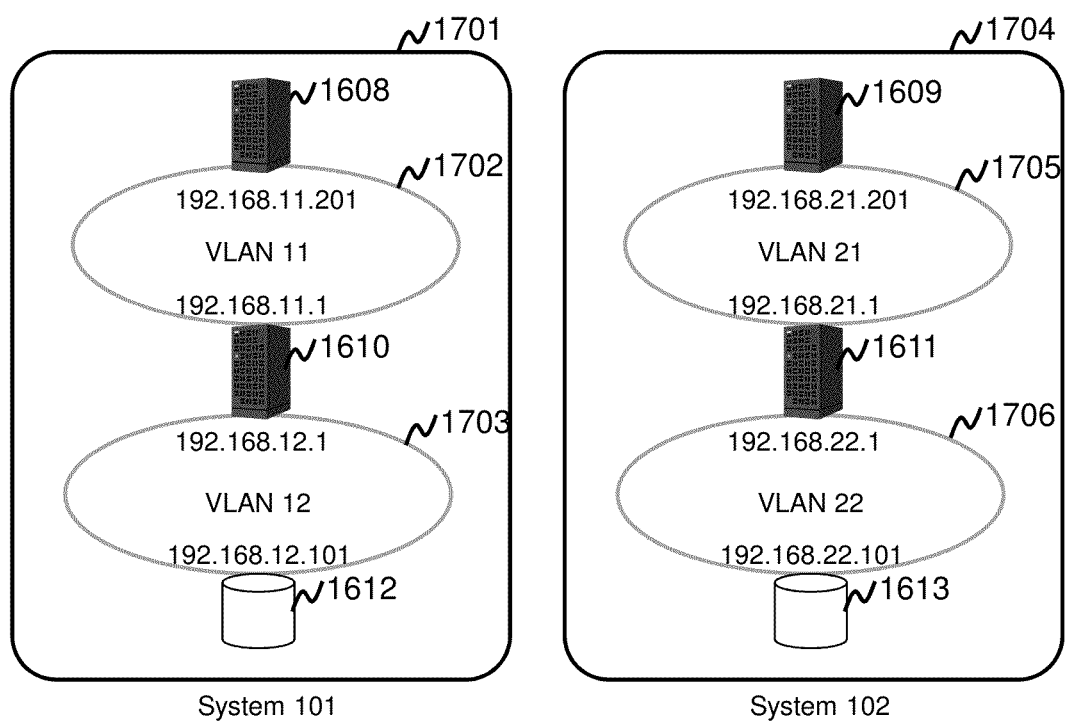
FIG. 17 shows an example of a logical view of the systems managed by the network manager and port switches in the network fabric system of FIG. 16.

FIG. 17 shows an example of a logical view of the systems managed by the network manager 1614 and port switches 1605-1607 in the network fabric system of FIG. 16. The system 101 includes the VLAN 11 and the VLAN 12 used to connect the Web server 1608, the application server 1610, and the iSCSI target 1612. The system 102 includes the VLAN 21 and the VLAN 22 used to connect the Web server 1609, the application server 1611, and the iSCSI target 1613.

Figure 18:
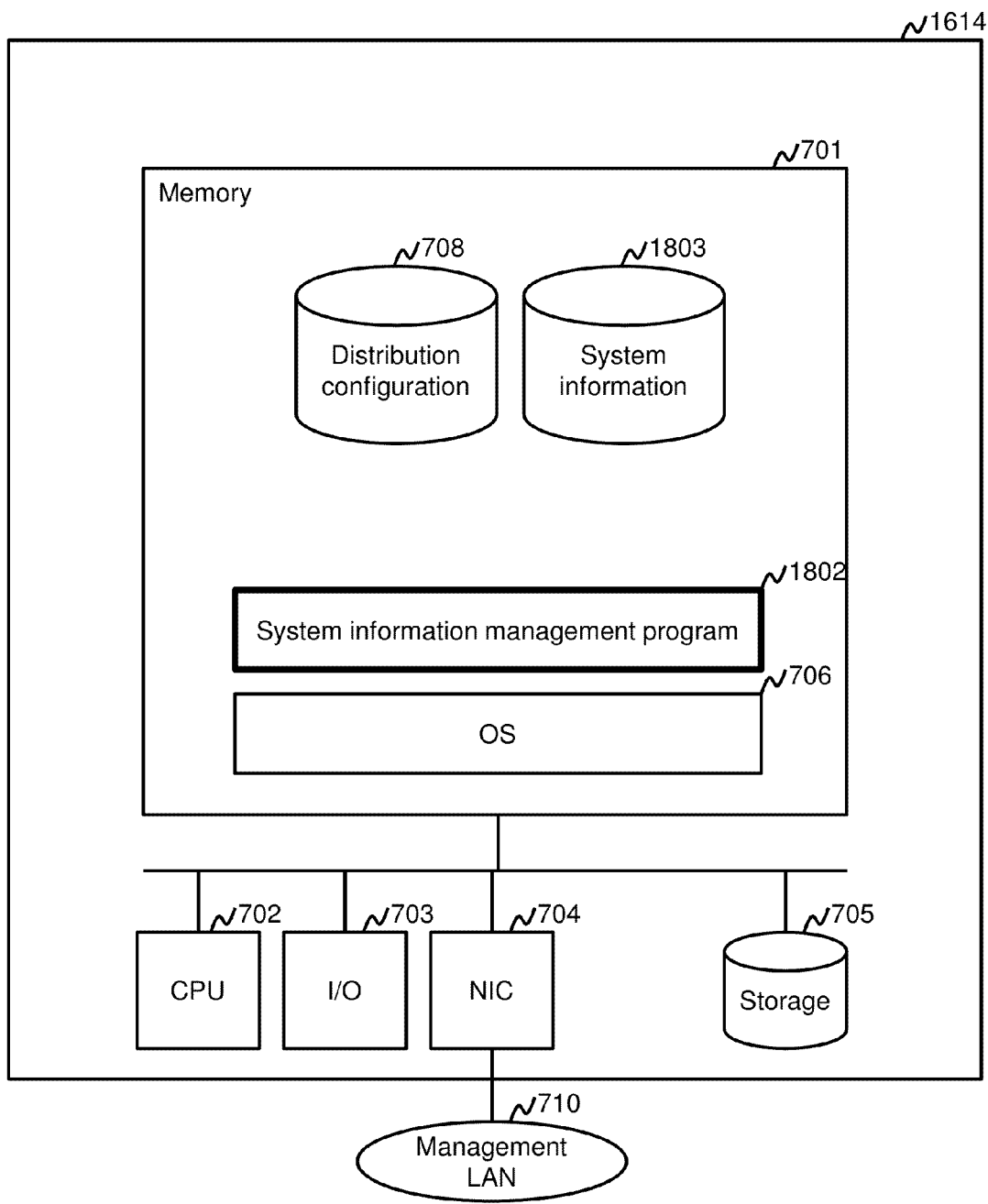
FIG. 18 shows an example of hardware and software architecture of the network manager located in the network of the second embodiment.

FIG. 18 shows an example of hardware and software architecture of the network manager 1614 located in the network of the second embodiment. It replaces the network manager 301 of the first embodiment (see FIG. 7). It contains system information 1803 on the memory 701 instead of the system information 709 of the first embodiment. Further, it contains system information management program 1802 instead of the system information management program 707 of the first embodiment.

FIG. 19 shows an example of the system information 1803 (VLAN/system ID mapping) used by the network manager 1614 according to the second embodiment, instead of the system information 709 (see FIG. 7) used in the first embodiment. The system information 1803 is implemented as a table. Each entry (1901-1904) in the table is composed of a VLAN name, a VLAN ID, and a system ID. In this system information 1803, a VLAN ID can be mapped to a single system ID. On the other hand, a system ID can be mapped to multiple VLAN IDs. It means that as shown in FIG. 17, a system may contain multiple VLANs to connect to different types of servers or storage devices with multiple IP segments.

Figure 20:
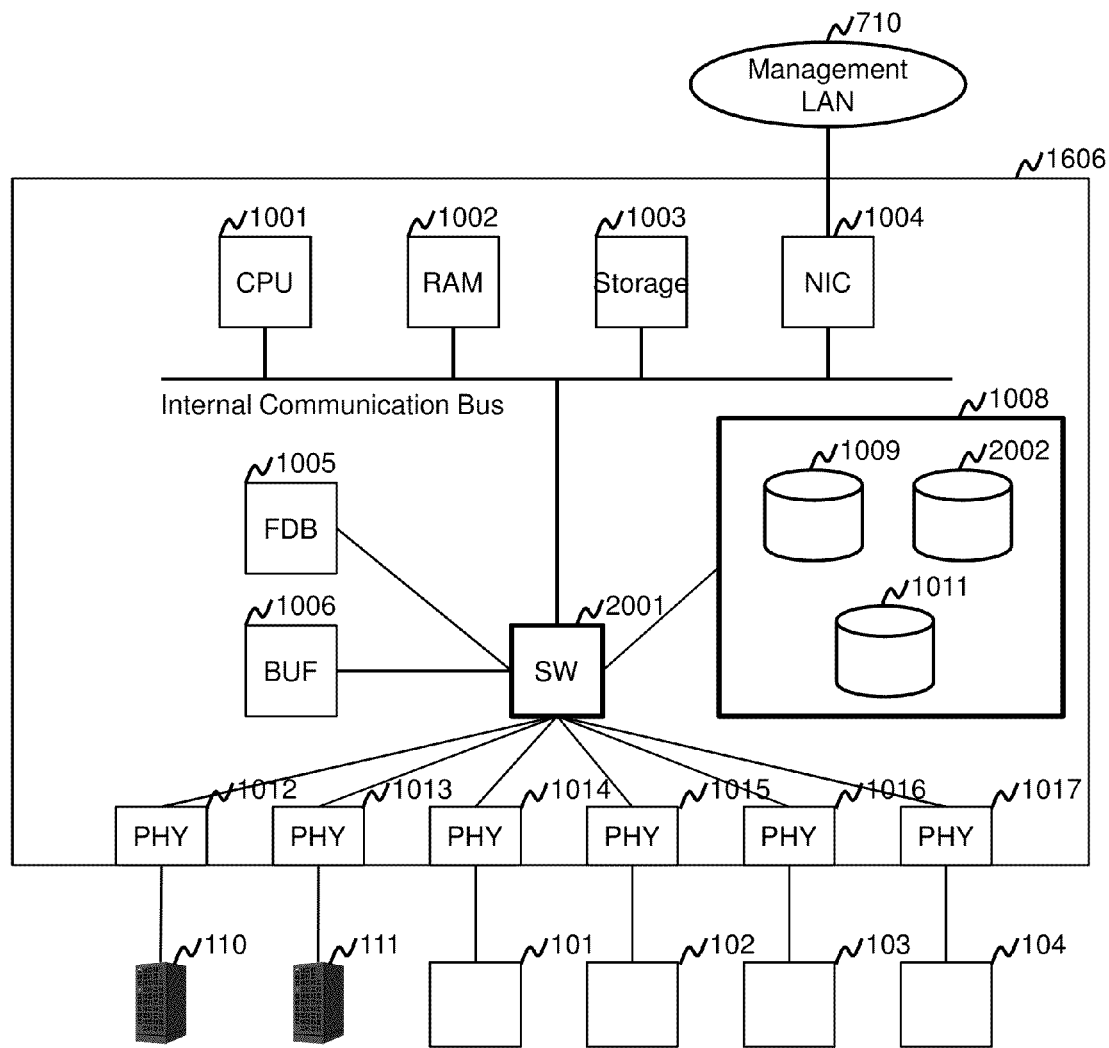
FIG. 20 shows an example of a block diagram of the port switches of the second embodiment.

FIG. 20 shows an example of a block diagram of the port switches 1605-1607 of the second embodiment. It contains the same components as the port switches 105-107 of the first embodiment (see FIG. 10) except for two components. It contains a switch device 2001 instead of the switch device 1007 of the first embodiment. Further, it contains the system information 2002 instead of the system information 1010 of the first embodiment.

FIG. 21 shows an example of the system information 2002 of the second embodiment. It is implemented as a table each entry of which is composed of a VLAN ID and a system ID. It is a subset of the system information 1803 stored in the network manager 1614. In this system information 2002, a VLAN ID can be mapped to a single system ID. On the other hand, a system ID can be mapped to multiple VLAN IDs. It means that as shown in FIG. 17, a system may contain multiple VLANs to connect to different types of servers or storage devices with multiple IP segments.

Figure 22:
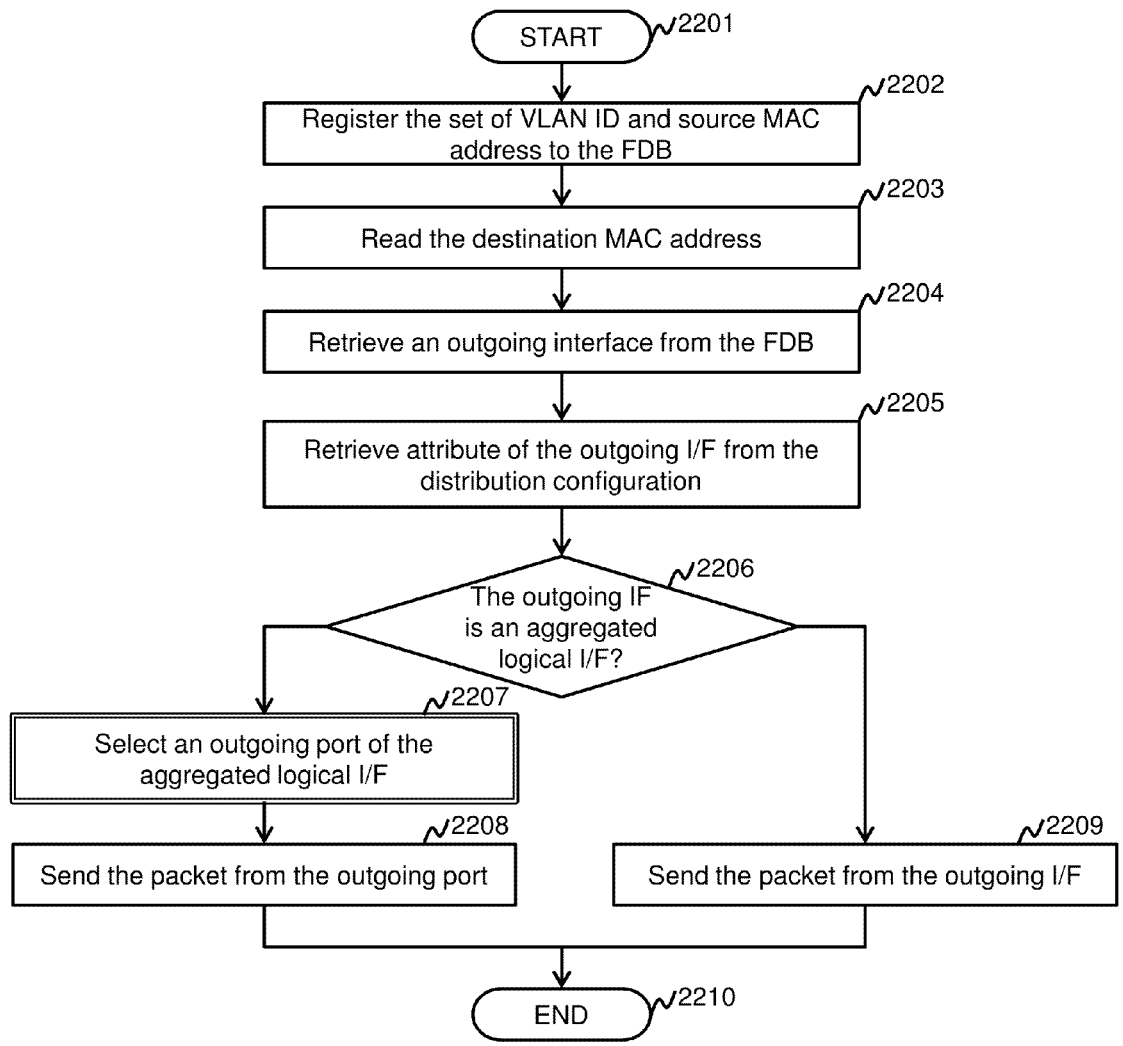
FIG. 22 shows an example of a flow diagram illustrating the process of the switch device.

FIG. 22 shows an example of a flow diagram illustrating the process of the switch device 2001. Same with general VLAN-supported switches, the switch device 2001 learns and registers the set of the VLAN ID in the VLAN tag of the received packets and the source MAC address of the received packets to the FDB 1005 (step 2202). It also reads the destination MAC address from the received packets (step 2203) and retrieves an outgoing interface corresponding to the set of the VLAN ID and the destination MAC address from the FDB 1005 (step 2204). These are the general process steps of VLAN-supported layer-2 switches. The switch device 2001 retrieves an attribute of the outgoing interface from the distributed configuration 1009 (step 2205). It then checks if the outgoing interface is a member of an aggregated logical interface (step 2206). It defines the outgoing interface as the member if the aggregation ID column of the distribution configuration 1009 contains any integer value.

Figure 23:
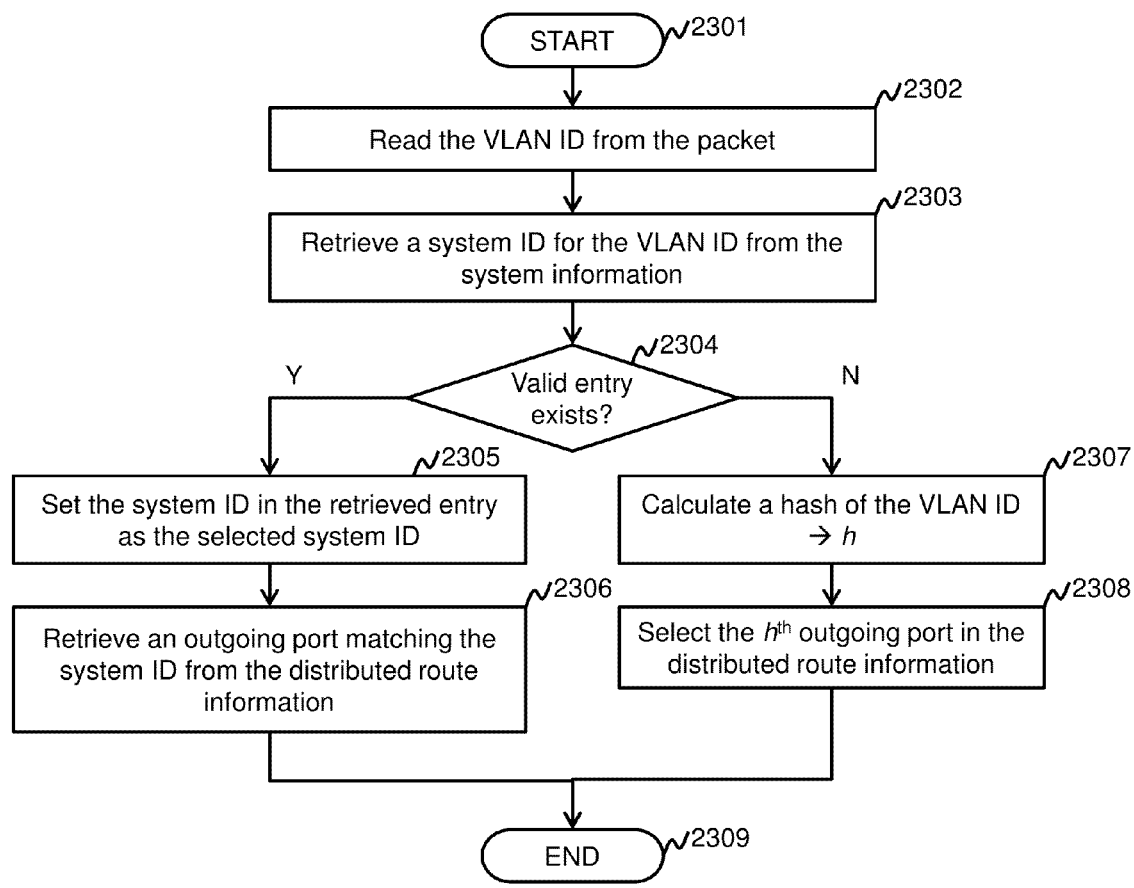
FIG. 23 shows an example of a flow diagram illustrating the above described process step 2207 of the switch device in FIG. 22.

If the checked outgoing interface is a member of an aggregated logical interface, the switch device 2001 starts to select an actual physical outgoing port in the aggregated logical interface (step 2207). The detail of this process is described later (FIG. 23). After selecting the actual outgoing port, it sends the packet from the selected outgoing port (step 2208) and terminates the process regarding the received packet (step 2210).

If the checked outgoing interface is not a member of an aggregated logical interface, the switch device 2001 sends the packet from the checked outgoing interface without additional process (step 2209) and terminates the process regarding the received packet (step 2210).

FIG. 23 shows an example of a flow diagram illustrating the above described process step 2207 of the switch device 2001 in FIG. 22. This flow diagram describes how to select an actual outgoing port from the member-ports of an aggregated logical interface. The switch device 2001 read the VLAN ID of the received packet (step 2302) and retrieves an entry matching the VLAN ID from the system information 2002 and tries to read the system ID in the retrieved entry (step 2303). It then checks if the valid entry exists in the system information 2002 (step 2304).

If a valid entry exists, the switch device 2001 sets the system ID in the retrieved entry as the selected system ID for the received packet (step 2305). It then retrieves a distributed route ID corresponding to the selected systems ID from the distributed route information 1011 (step 2306). The distributed route ID represents the order of the selected fabric switch as described above in connection with FIG. 13. It directly corresponds to an outgoing port. It then ends the process of selecting an outgoing port (step 2309).

If a valid entry does not exist, to select an outgoing port according to some other attributes, the switch device 2001 calculates a hash of the VLAN ID of the received packet with the length of the number of physical ports of the retrieved aggregated logical interface (step 2307). It then selects an outgoing port from the distributed route information 1011 according to an order of the hash value (step 2308). It then ends the process of selecting an outgoing port (step 2309).

Third Embodiment

VXLAN ID Based Mapping

Figure 24:
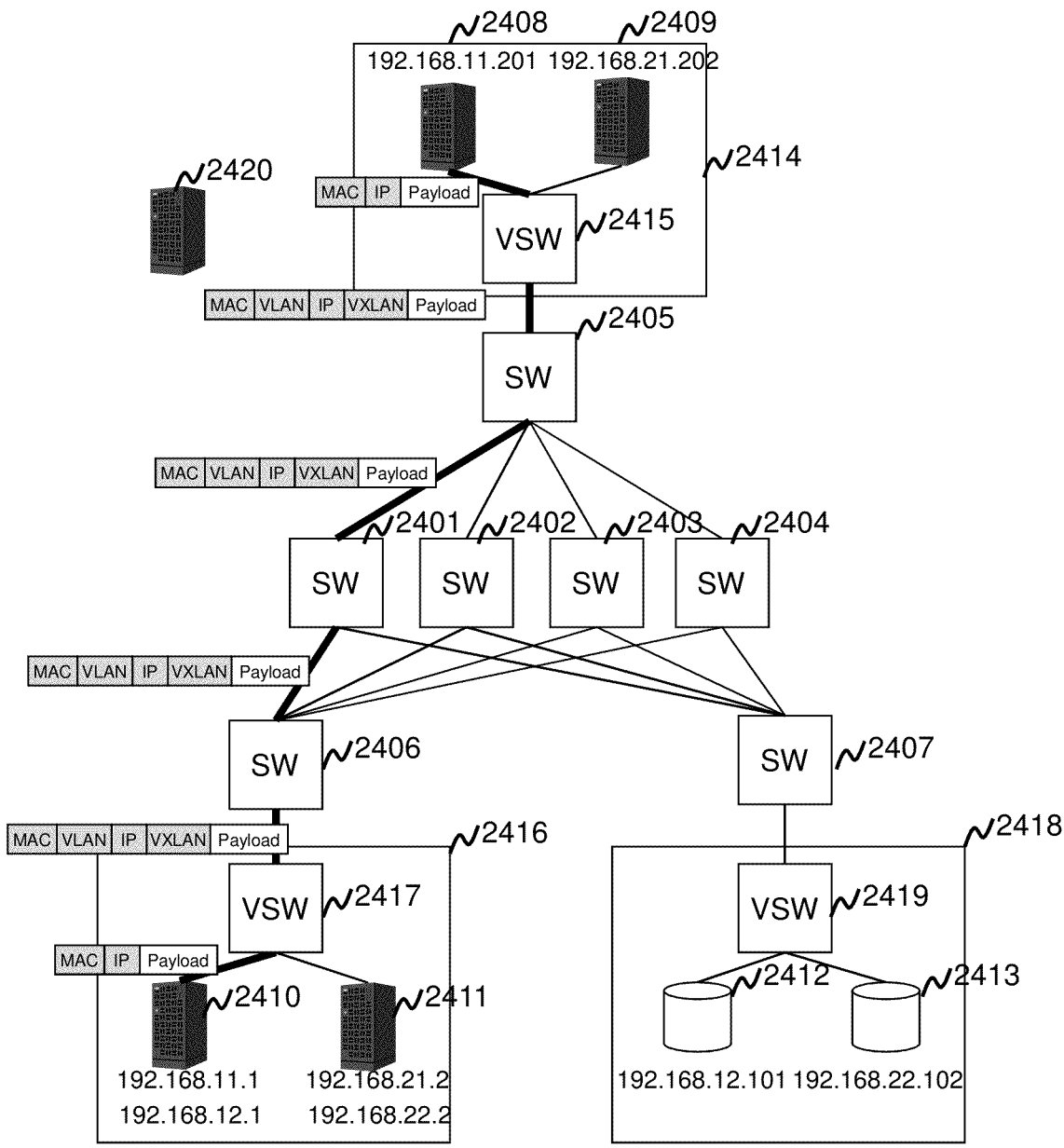
FIG. 24 shows an example of a network topology of the network fabric system according to a third embodiment of the present invention.

FIG. 24 shows an example of a network topology of the network fabric system according to a third embodiment of the present invention. It includes four fabric switches 2401-2404, three port switches 2405-2407, two Web servers 2408 and 2409 and a virtual switch 2415 in a physical server 2414, two application servers 2410 and 2411 and a virtual switch 2417 in a physical server 2416, and two iSCSI targets 2412 and 2413 and a virtual switch 2419 in a physical server 2418. End nodes run on virtual machines created on the physical servers 2414, 2416, 2418. The virtual switches 2415, 2417, and 2419 connect among the end nodes and the port switches 2405-2407, respectively. In this embodiment, creating isolated layer-2 network segments are realized by VXLANs. The virtual switches play a role of edge switches of a VXLAN network.

In this embodiment, the virtual switches 2415, 2417, and 2419 manage the relationship between network segments identified by the VXLAN Network Identifier (VNI) and systems. According to this information, the virtual switches 2415, 2417, and 2419 append VLAN tags and VXLAN headers to packets received from end nodes and forward the packets to port switches 2405-2407. The VLAN tags contain VLAN IDs which have the same number as the system ID in the system information.

Figure 25:
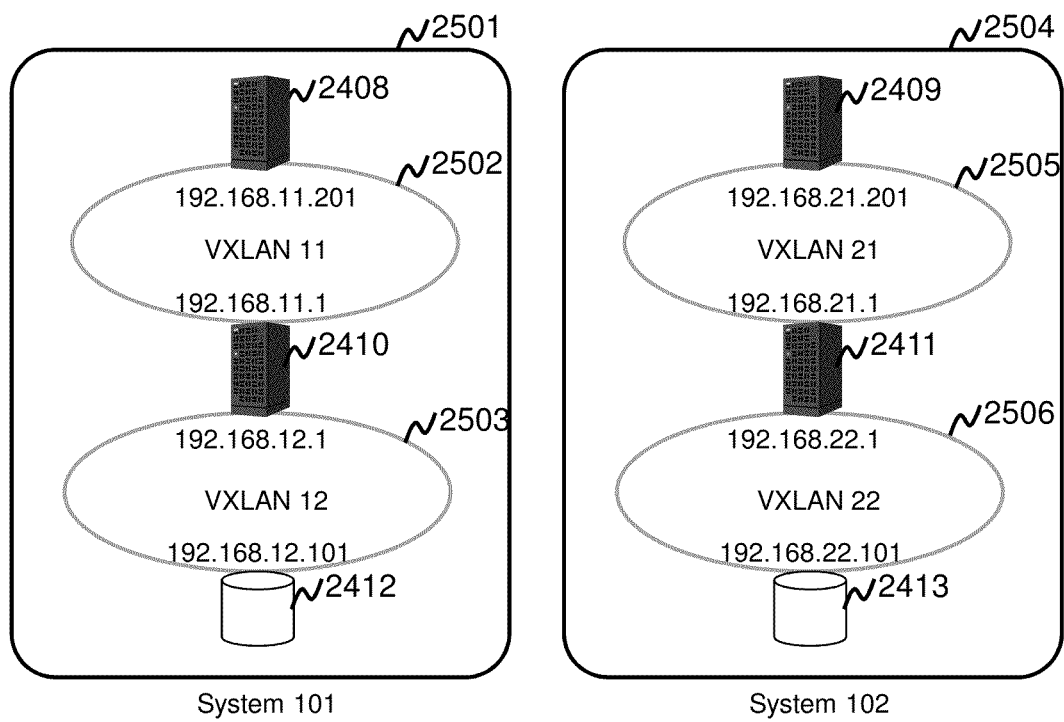
FIG. 25 shows an example of a logical view of the systems managed by the network manager and port switches in the third embodiment of the present invention.

FIG. 25 shows an example of a logical view of the systems managed by the network manager 2420 and port switches 2405-2407 in the third embodiment of the present invention. The system 101 includes VXLAN 11 2502 and VXLAN 12 2503 connecting the Web server 2408, the application server 2410, and the iSCSI target 2412. The system 102 includes VXLAN 21 2505 and VXLAN 22 2506 connecting the Web server 2409, the application server 2411, and the iSCSI target 2413.

Figure 26:
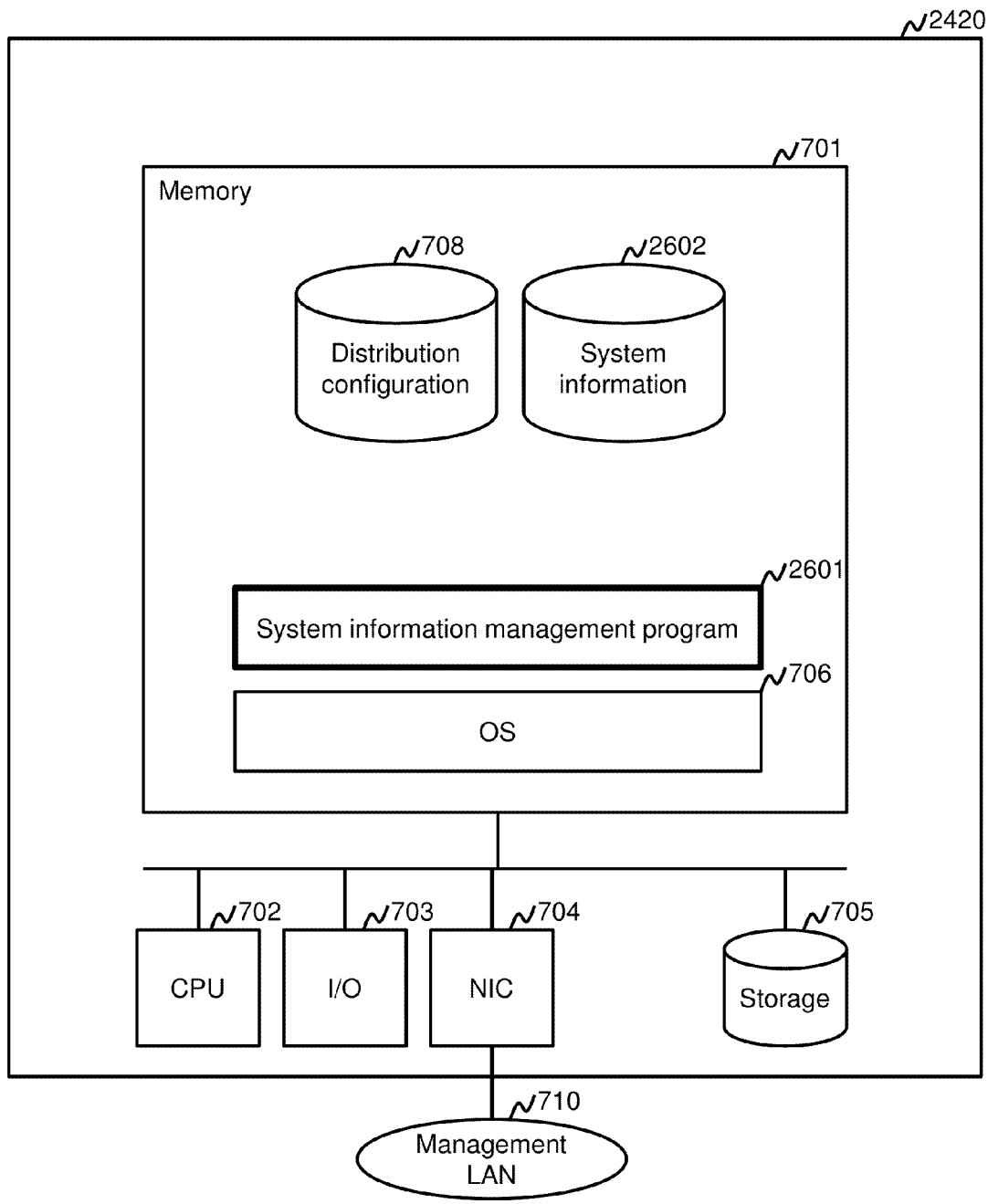
FIG. 26 shows an example of hardware and software architecture of the network manager located in the network of the third embodiment.

FIG. 26 shows an example of hardware and software architecture of the network manager 2420 located in the network of the third embodiment. It replaces the network manager 301 of the first embodiment (see FIG. 7). It contains system information 2602 on the memory 701 instead of the system information 709 of the first embodiment. Further, it contains system information management program 2601 instead of the system information management program 507 of the first embodiment.

FIG. 27 shows an example of the system information (VXLAN/system ID mapping) 2602 used by the network manager 2420 according to the third embodiment, instead of the system information 709 (see FIG. 7). The system information 2602 is implemented as a table. Each entry (2701-2704) in the table is composed of a VXLAN name, a VXLAN Network Identifier (VNI), and a system ID. In this system information 2602, a VNI can be mapped to a single system ID. On the other hand, a system ID can be mapped to multiple VNIs. It means that as shown in FIG. 25, a system may contain multiple VXLANs to connect to different types of servers or storage devices with multiple IP segments.

Figure 28:
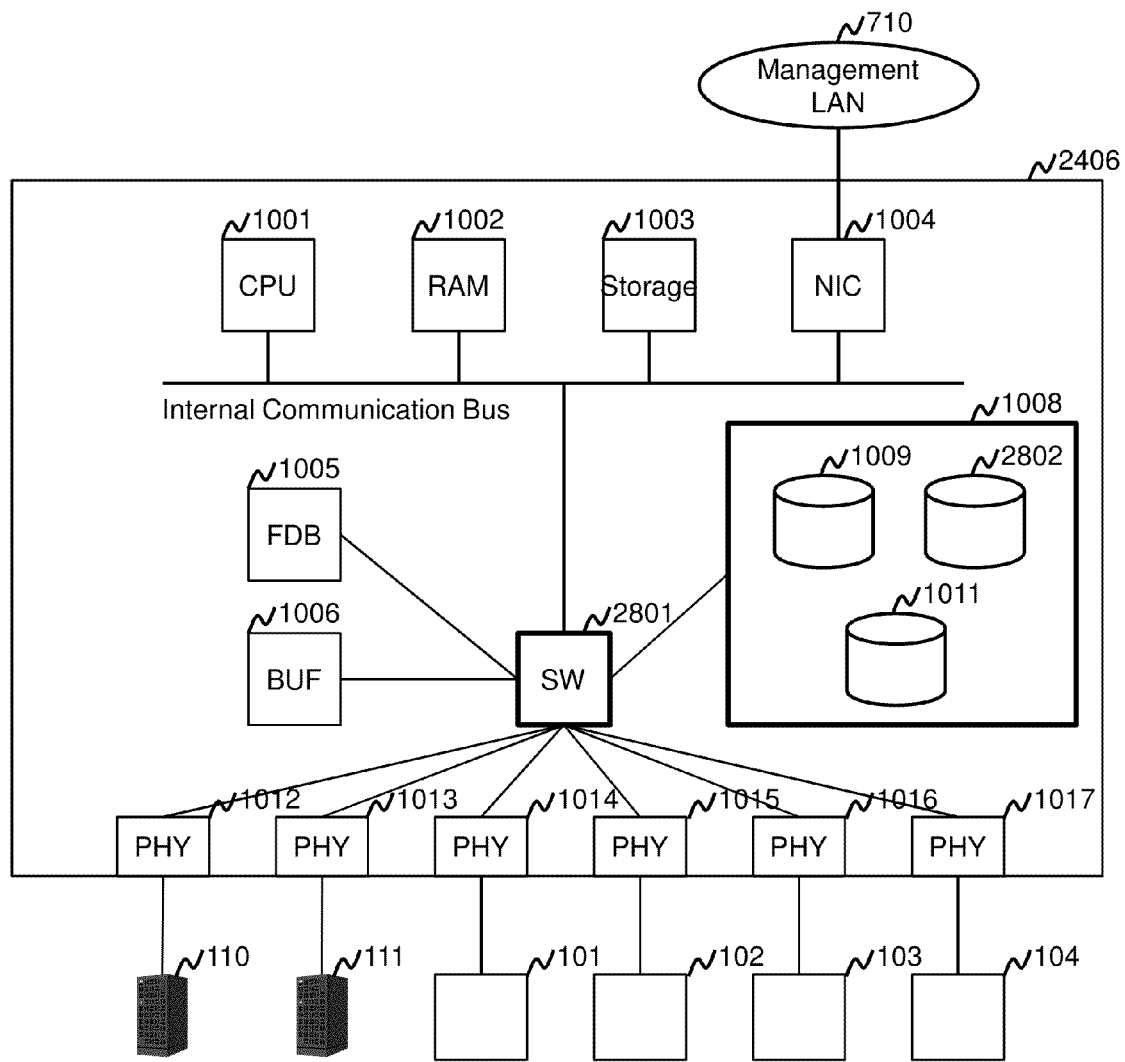
FIG. 28 shows an example of a block diagram of the port switches of the third embodiment.

FIG. 28 shows an example of a block diagram of the port switches 2405-2407 of the third embodiment. It contains the same components as the port switches 105-107 of the first embodiment (FIG. 10) except for two components. It contains a switch device 2801 instead of the switch device 1007 of the first embodiment. Further, it contains the system information 2802 instead of the system information 1010 of the first embodiment.

FIG. 29 shows an example of the system information 2802 of the third embodiment. It is implemented as a table each entry of which is composed of a VNI and a system ID. It is a subset of the system information 2602 stored in the network manager 2420. In this system information 2802, a VNI can be mapped to a single system ID. On the other hand, a system ID can be mapped to multiple VNIs. It means that as shown in FIG. 25, a system may contain multiple VXLANs to connect to different types of servers and storage devices with multiple IP segments.

Figure 30:
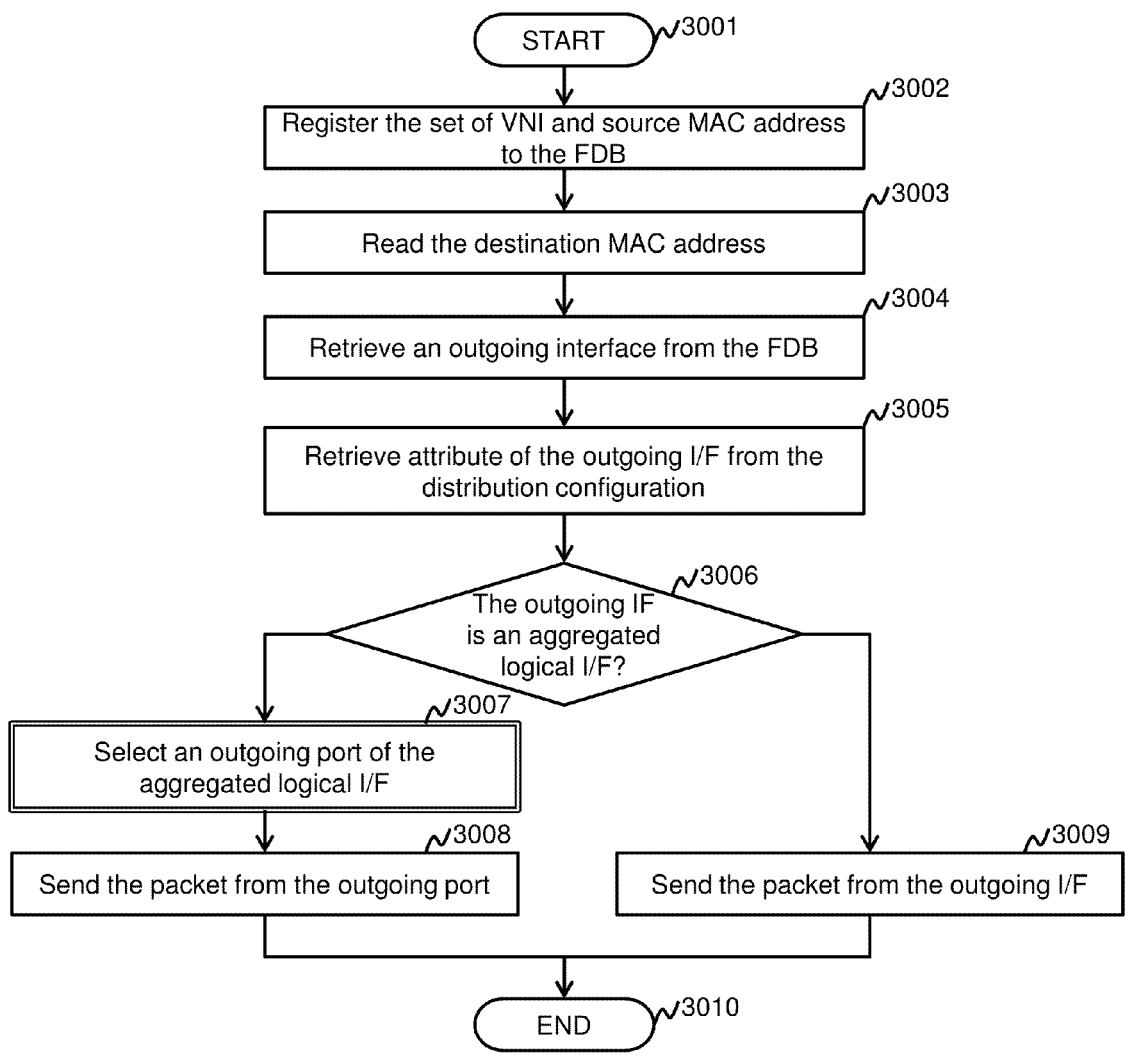
FIG. 30 shows an example of a flow diagram illustrating the process of the switch device.

FIG. 30 shows an example of a flow diagram illustrating the process of the switch device 2801. Same with general VXLAN-supported switches, the switch device 2801 learns and registers the set of the VNI in the VXLAN header of the received packets and the outer source MAC address of the received packets to the FDB 1005 (step 3002). It also reads the outer destination MAC address from the received packets (step 3003) and retrieves an outgoing interface corresponding to the set of the VNI and the outer destination MAC address from the FDB 1005 (step 3004). The switch device 2801 retrieves an attribute of the outgoing interface from the distributed configuration 1009 (step 3005). It then checks if the outgoing interface is a member of an aggregated logical interface (step 3006). It defines the outgoing interface as the member if the aggregation ID column of the distribution configuration 1009 contains any integer value.

Figure 31:
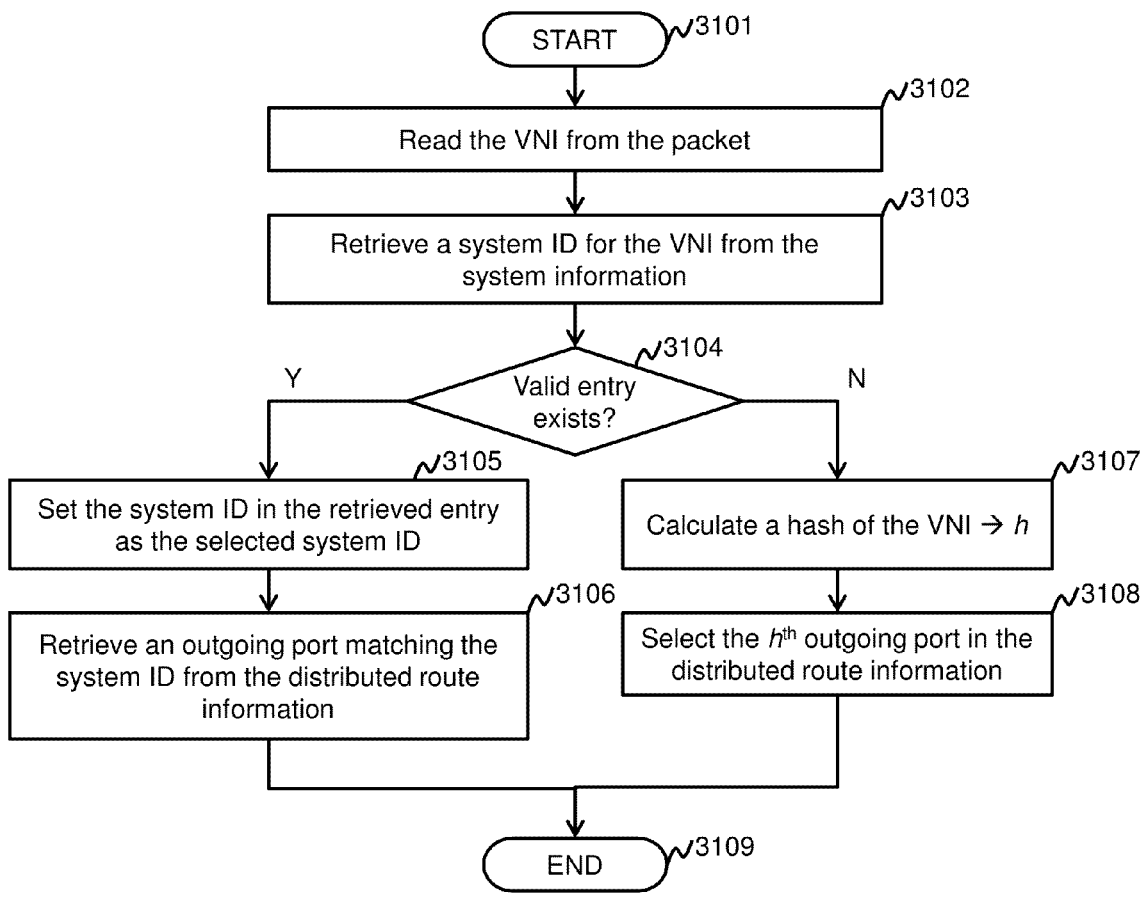
FIG. 31 shows an example of a flow diagram illustrating the above described process step 3007 of the switch device in FIG. 30.

If the checked outgoing interface is a member of an aggregated logical interface, the switch device 2801 starts to select an actual physical outgoing port in the aggregated logical interface (step 3007). The detail of this process is described later (FIG. 31). After selecting the actual outgoing port, it sends the packet from the selected outgoing port (step 3008) and terminates the process regarding the received packet (step 3010).

If the checked outgoing interface is not a member of an aggregated logical interface, the switch device 2801 sends the packet from the checked outgoing interface without additional process (step 3009) and terminates the process regarding the received packet (step 3010).

FIG. 31 shows an example of a flow diagram illustrating the above described process step 3007 of the switch device 2801 in FIG. 30. This flow diagram describes how to select an actual outgoing port from the member-ports of an aggregated logical interface. The switch device 2801 reads the VNI of the received packet (step 3102) and retrieves an entry matching the VNI from the system information 2802 and tries to read the system ID in the retrieved entry (step 3103). It then checks if the valid entry exists in the system information 2802 (step 3104).

If a valid entry exists, the switch device 2801 sets the system ID in the retrieved entry as the selected system ID for the received packet (3105). It then retrieves a distributed route ID corresponding to the selected system ID from the distributed route information 1011 (step 3106). The distributed route ID represents the order of the selected fabric switch as described above in connection with FIG. 13. It directly corresponds to an outgoing port. It then ends the process of selecting an outgoing port (step 3109).

If a valid entry does not exist, to select an outgoing port according to some other attributes, the switch device 2801 calculates a hash of the VNI of the received packet with the length of the number of physical ports of the retrieved aggregated logical interface (step 3107). It then selects an outgoing port from the distributed route information 1011 according to an order of the hash value (step 3108). It then ends the process of selecting an outgoing port (step 3109).

Fourth Embodiment

Figure 32:
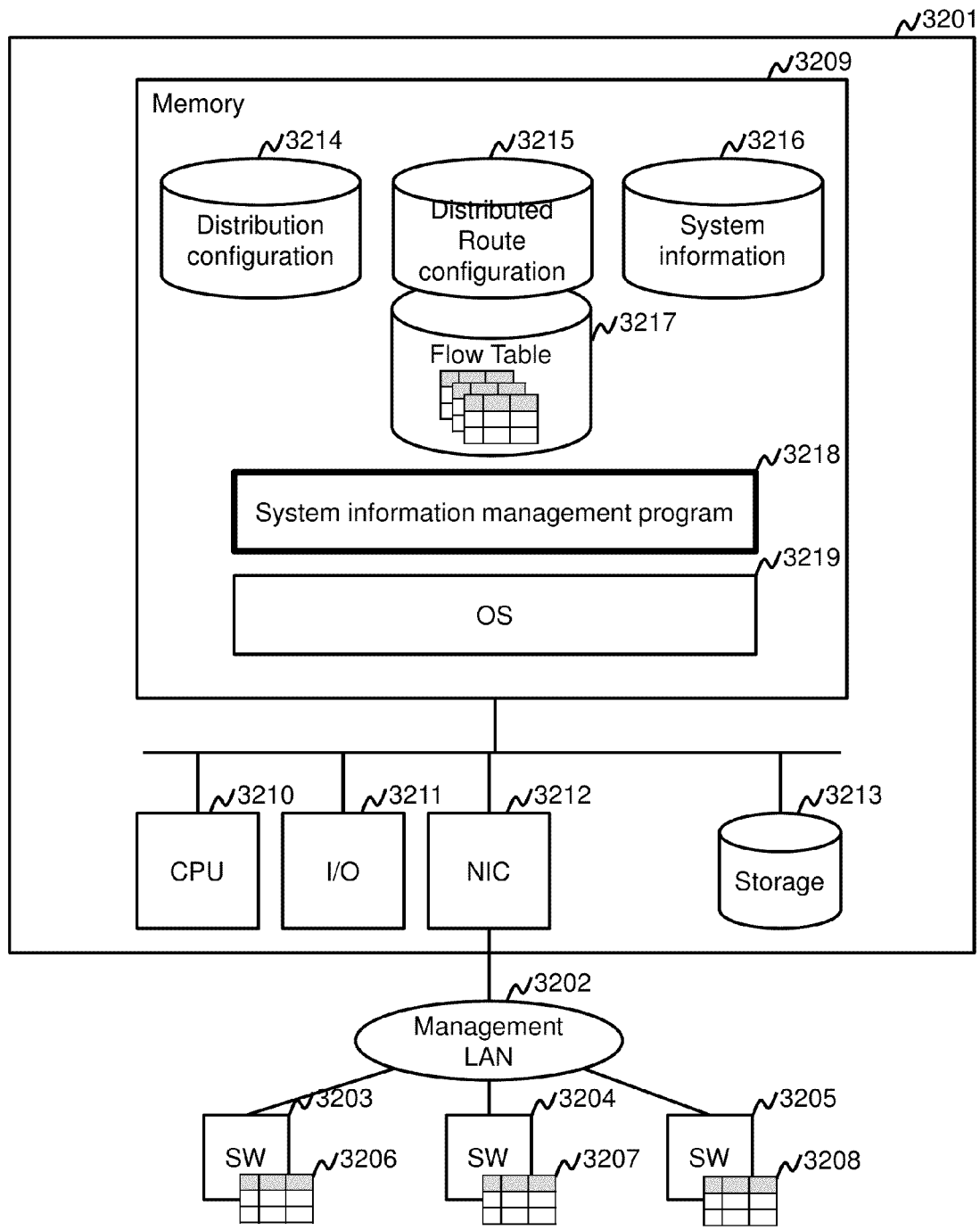
FIG. 32 shows an example of a part of the system architecture of the fourth embodiment of the present invention.

FIG. 32 shows an example of a part of the system architecture of the fourth embodiment of the present invention. It also shows hardware and software architecture of the network manager of the fourth embodiment of the present invention. As a further embodiment in addition to the above described three embodiments, we can reach easily the notion that the present invention is implemented with the so-called Software-Defined Networking (SDN) architecture.

The network system contains network manager 3201, a management LAN 3202, port switches 3203-3205 that have flow tables 3206-3208. The network manager 3201 has a memory 3209, a CPU 3210, I/O 3211, a NIC 3212, and a storage device 3213. The memory 3209 stores distribution configuration information 3214 which is equivalent to the distribution configuration information 708 of the first embodiment. It also stores distributed route configuration information 3215 which is equivalent to the distributed route information 1011 in the first embodiment. It also stores the system information 3216 which is equivalent to the system information 709, 1803, and 2602 in the first, the second, and the third embodiment respectively. It also stores flow tables 3217 for port switches 3203-3205. It also executes the system information management program 3218 and OS 3219.

With the architecture, the outgoing-port selection process of the switch device 1007, 2001, and 2801 according to the respective flow diagrams in FIG. 15, FIG. 23, and FIG. 31 is implemented as a software module on the network manager 301, 1614, and 2420 respectively. When the packet that have not been learned arrives a port switch 3206-3208, the port switch 3206-3208 forwards the packet to the network manager 3201. Then system information management program 3218 of the network manager 301, 1614, and 2420 asks port switches 105-107, 1605-1607, and 2405-2407 to configure their flow tables so that they forward received packets according to the results of the outgoing-port selection process.

For the system of the first embodiment, the network manager 3201 adds a source IP address of the received packet into the match field of a flow entry. It also sets the identifier of the "packet-forwarding" action with the selected outgoing physical port into the instruction field of the flow entry.

For the system of the second embodiment, the network manager 3201 adds a VLAN ID of the received packet into the match field of a flow entry. It also set the identifier of the "packet-forwarding" action with the selected outgoing physical port into the instruction field of the flow entry.

For the system of the third embodiment, the network manager 3201 adds a VNI of the received packet into the match field of a flow entry. It also set the identifier of the "packet-forwarding" action with the selected outgoing physical port into the instruction field of the flow entry.

Of course, the system configurations illustrated in FIGS. 3, 16, 19, and 32 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for distributing network traffic to multiple paths in a network fabric. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A method of controlling network traffic using a port switch that includes a memory and a controller, the method comprising:

storing, in the memory:

distributed route information comprising at least two system identifiers (IDs) and at least two distributed route IDs, wherein a route ID identifies a specific physical path from multiple physical paths of a network fabric;

a first logical group which has a first plurality of IP addresses of a first plurality of ports and is assigned to a first system ID, wherein the first logical group is assigned to the first system ID by correlating the IP addresses of the first plurality of ports in the first logical group with the first system ID, the first plurality of ports are assigned to a first route ID, the first system ID corresponds to the first route ID, and the first system ID identifies a first fabric switch; and a second logical group which has a second plurality of IP addresses of a second plurality of ports and is assigned to a second system ID, wherein the second logical group is assigned to the second system ID by correlating the IP addresses of the second plurality of ports in the second logical group with the second system ID, the second plurality of ports are assigned to a second route ID, the second system ID corresponds to the second route ID, and the second system ID identifies a second fabric switch; and receiving a plurality of packets, and for each received packet:

reading a source IP address of the received packet, and determining whether the source IP address matches an IP address of the first plurality of ports or second plurality of ports;

upon determining that the source IP address matches an IP address of the first plurality of ports or the second plurality of ports, determining whether the source IP address is assigned to the first system ID or the second system ID;

upon determining that the source IP address is assigned to the first system ID, determining an outgoing port for the packet based on the first physical path and causing the first logical group to use the first physical path which is different from a second physical path; and upon determining that the source IP address is assigned to the second system ID, determining an outgoing port for the packet based on the second physical path and causing the second logical group to use the second physical path;

upon determining that the source IP address does not match an IP address of the first plurality of ports and the second plurality of ports, reading a destination IP address of the received packet, and determining whether the destination IP address matches an IP address of the first plurality of ports or the second plurality of ports;

upon determining that the destination IP address matches an IP address of the first plurality of ports or the second plurality of ports, determining whether the destination IP address is assigned to the first system ID or the second system ID;

upon determining that the destination IP address is assigned to the first system ID, determining an outgoing port for the packet based on the first physical path and causing the first logical group to use the first physical path; and upon determining that the destination IP address is assigned to the second system ID, determining an outgoing port for the packet based on the second physical path and causing the second logical group to use the second physical path; and upon determining that the destination IP address matches neither an IP address of the first plurality of ports nor the second plurality of ports, calculating a hash value of the source IP address and the destination IP address of the received packet, and selecting an outgoing port from the distributed route information according to an order of the hash value based on a correlation between order of hash values and order of paths through a network fabric.

2. The method according to claim 1, wherein correspondence between the first system ID and the first route ID indicates first paths associated with the first route ID and using the first fabric switch, and correspondence between the second system ID and the second route ID indicates second paths associated with the second route ID and using the second fabric switch.

3. The method according to claim 1, wherein each distributed route ID directly corresponds to an outgoing port.

4. The method according to claim 1, wherein the first logical group is assigned to the first system ID by correlating VLAN (Virtual Logical Area Network) IDs of the first plurality of ports in the first logical group with the first system ID; and wherein the second logical group is assigned to the second system ID by correlating VLAN IDs of the second plurality of ports in the second logical group with the second system ID.

5. The method according to claim 4, further comprising, for each packet received:

reading a VLAN ID of the received packet;

if the VLAN ID of the received packet matches a VLAN ID of the first plurality of ports or the second plurality of ports, determining whether the VLAN ID is assigned to the first system ID or the second system ID; if the VLAN ID is assigned to the first system ID, determining an outgoing port for the packet based on the first physical path; and if the VLAN ID is assigned to the second system ID, determining an outgoing port for the packet based on the second physical path; and if the VLAN ID does not match a VLAN ID of the first plurality of ports and the second plurality of ports, calculating a hash value of the VLAN ID of the packet and select an outgoing port from the distributed route information according to an order of the hash value based on a correlation between order of hash values and order of paths through the network fabric.

6. The method according to claim 1,
wherein the first logical group is assigned to the first system ID by correlating VNIs (VXLAN (Virtual eXtensible LAN) Network Identifiers) of the first plurality of ports in the first logical group with the first system ID;
wherein the second logical group is assigned to the second system ID by correlating VNIs of the second plurality of ports in the second logical group with the second system ID; and
wherein the method further comprises, for each packet received:
reading a VNI of the received packet;
if the VNI of the received packet matches a VNI of the first plurality of ports or the second plurality of ports, determining whether the VNI is assigned to the first system ID or the second system ID; if the VNI is assigned to the first system ID, determining an outgoing port for the packet based on the first physical path; and if the VNI is assigned to the second system ID, determining an outgoing port for the packet based on the second physical path; and
if the VNI does not match a VNI of the first plurality of ports and the second plurality of ports, calculating a hash value of the VNI of the packet and select an outgoing port from the distributed route information according to an order of the hash value based on a correlation between order of hash values and order of paths through the network fabric.

7. A port switch comprising:
a memory storing distributed route information comprising at least two system identifiers (IDs) and at least two distributed route IDs, wherein a route ID identifies a specific physical path from multiple physical paths of a network fabric;
a first logical group which has a first plurality of Internet Protocol (IP) addresses of a first plurality of ports and is assigned to a first system ID, wherein the first logical group is assigned to the first system ID by correlating the IP addresses of the first plurality of ports in the first logical group with the first system ID, the first plurality of ports are assigned to a first route ID, the first system ID corresponds to the first route ID, and the first system ID identifies a first fabric switch; and
a second logical group which has a second plurality of IP addresses of a second plurality of ports and is assigned to a second system ID, wherein the second logical group is assigned to the second system ID by correlating the IP addresses of the second plurality of ports in the second logical group with the second system ID, the second plurality of ports are assigned to a second route ID, the second system ID corresponds to the second route ID, and the second system ID identifies a second fabric switch; and
a controller configured to receive a plurality of packets, and for each received packet is configured to:
read a source IP address of the received packet, and determine whether the source IP address matches an IP address of the first plurality of ports or second plurality of ports; and
upon determining that the source IP address matches an IP address of the first plurality of ports or the second plurality of ports, determine whether the source IP address is assigned to the first system ID or the second system ID;

upon determining that the source IP address is assigned to the first system ID, determine an outgoing port for the packet based on a first physical path and cause the first logical group to use the first physical path which is different from a second physical path; and
upon determining that the source IP address is assigned to the second system ID, determine an outgoing port for the packet based on the second physical path and cause the second logical group to use the second physical path;
upon determining that the source IP address matches neither an IP address of the first plurality of ports nor the second plurality of ports,
read a destination IP address of the received packet, and determine whether the destination IP address matches an IP address of the first plurality of ports or the second plurality of ports;
upon determining that the destination IP address matches an IP address of the first plurality of ports or the second plurality of ports, determine whether the destination IP address is assigned to the first system ID or the second system ID;
upon determining that the destination IP address is assigned to the first system ID, determine an outgoing port for the packet based on the first physical path and cause the first logical group to use the first physical path; and
upon determining that the destination IP address is assigned to the second system ID, determine an outgoing port for the packet based on the second physical path and cause the second logical group to use the second physical path; and
upon determining that the destination IP address matches neither an IP address of the first plurality of ports nor the second plurality of ports, calculate a hash value of the source IP address and the destination IP address of the received packet, and
select an outgoing port from the distributed route information according to an order of the hash value based on a correlation between order of hash values and order of paths through the network fabric.

8. The port switch according to claim 7,
wherein correspondence between the first system ID and the first route ID indicates first paths associated with the first route ID and using the first fabric switch, and correspondence between the second system ID and the second route ID indicates second paths associated with the second route ID and using the second fabric switch.

9. The port switch according to claim 7, wherein each distributed route ID directly corresponds to an outgoing port.

10. The port switch according to claim 7,
wherein the first logical group is assigned to the first system ID by correlating VLAN (Virtual Logical Area Network) IDs of the first plurality of ports in the first logical group with the first system ID; and
wherein the second logical group is assigned to the second system ID by correlating VLAN IDs of the second plurality of ports in the second logical group with the second system ID.

11. The port switch according to claim 10, wherein the controller is configured, for each packet received, to:
read a VLAN ID of the received packet;
if the VLAN ID of the received packet matches a VLAN ID of the first plurality of ports or the second plurality of ports, determine whether the VLAN ID is assigned to the first system ID or the second system ID; if the VLAN ID is assigned to the first system ID, determine an outgoing port for the packet based on the first physical path; and if the VLAN ID is assigned to the second system ID, determine an outgoing port for the packet based on the second physical path; and if the VLAN ID does not match a VLAN ID of the first plurality of ports and the second plurality of ports, calculate a hash value of the VLAN ID of the packet and select an outgoing port from the distributed route information according to an order of the hash value based on a correlation between order of hash values and order of paths through the network fabric.

12. The port switch according to claim 7, wherein the first logical group is assigned to the first system ID by correlating VNIs (VXLAN (Virtual eXtensible LAN) Network Identifiers) of the first plurality of ports in the first logical group with the first system ID; and wherein the second logical group is assigned to the second system ID by correlating VNIs of the second plurality of ports in the second logical group with the second system ID.

13. The port switch according to claim 12, wherein the controller is configured, for each packet received, to:

read a VNI of the received packet;

if the VNI of the received packet matches a VNI of the first plurality of ports or the second plurality of ports, determine whether the VNI is assigned to the first system ID or the second system ID; if the VNI is assigned to the first system ID, determine an outgoing port for the packet based on the first physical path; and if the VNI is assigned to the second system ID, determine an outgoing port for the packet based on the second physical path; and if the VNI does not match a VNI of the first plurality of ports and the second plurality of ports, calculate a hash value of the VNI of the packet and select an outgoing port from the distributed route information according to an order of the hash value based on a correlation between order of hash values and order of paths through the network fabric.

14. A non-transitory computer-readable storage medium storing a plurality of instructions for controlling a data processor to manage network traffic, the plurality of instructions comprising:

instructions that cause the data processor to store, in a memory of a port switch:

distributed route information comprising at least two system identifiers (IDs) and at least two distributed route IDs, wherein a route ID identifies a specific physical path from multiple physical paths of a network fabric;

a first logical group which has a first plurality of IP addresses of a first plurality of ports and is assigned to a first system ID, wherein the first logical group is assigned to the first system ID by correlating the IP addresses of the first plurality of ports in the first logical group with the first system ID, the first plurality of ports are assigned to a first route ID, the first system ID corresponds to the first route ID, and the first system ID identifies a first fabric switch; and a second logical group which has a second plurality of IP addresses of a second plurality of ports and is assigned to a second system ID, wherein the second logical group is assigned to the second system ID by correlating the IP addresses of the second plurality of ports in the second logical group with the second system ID, the second plurality of ports are assigned to a second route ID, the second system ID corresponds to the second route ID, and the second system ID identifies a second fabric switch; and instructions that cause the data processor to receive a plurality of packets, and for each received packet to:

to read a source IP address of the received packet, and determine whether the source IP address matches an IP address of the first plurality of ports or second plurality of ports; and upon determining that the source IP address matches an IP address of the first plurality of ports or the second plurality of ports, determine whether the source IP address is assigned to the first system ID or the second system ID;

upon determining that the source IP address is assigned to the first system ID, determine an outgoing port for the packet based on a first physical path and cause the first logical group to use the first physical path which is different from a second physical path; and upon determining that the source IP address is assigned to the second system ID, determine an outgoing port for the packet based on the second physical path and cause the second logical group to use the second physical path;

upon determining that the source IP address matches neither an IP address of the first plurality of ports nor the second plurality of ports, read a destination IP address of the received packet, and determine whether the destination IP address matches an IP address of the first plurality of ports or the second plurality of ports:

upon determining that the destination IP address matches an IP address of the first plurality of ports or the second plurality of ports, determine whether the destination IP address is assigned to the first system ID or the second system ID;

upon determining that the destination IP address is assigned to the first system ID, determine an outgoing port for the packet based on the first physical path and cause the first logical group to use the first physical path; and upon determining that the destination IP address is assigned to the second system ID, determine an outgoing port for the packet based on the second physical path and cause the second logical group to use the second physical path; and upon determining that the destination IP address matches neither an IP address of the first plurality of ports nor the second plurality of ports, calculate a hash value of the source IP address and the destination IP address of the received packet, and select an outgoing port from the distributed route information according to an order of the hash value based on a correlation between order of hash values and order of paths through a network fabric.

15. The computer-readable storage medium according to claim 14, wherein correspondence between the first system ID and the first route ID indicates first paths associated with the first route ID and using the first fabric switch, and correspondence between the second system ID and the second route ID indicates second paths associated with the second route ID and using the second fabric switch.

16. The non-transitory computer-readable storage medium according to claim 14, wherein each distributed route ID directly corresponds to an outgoing port.

17. The non-transitory computer-readable storage medium according to claim 14, wherein the first logical group is assigned to the first system ID by correlating VLAN (Virtual Logical Area Network) IDs of the first plurality of ports in the first logical group with the first system ID; and wherein the second logical group is assigned to the second system ID by correlating VLAN IDs of the second plurality of ports in the second logical group with the second system ID.

18. The non-transitory computer-readable storage medium according to claim 17, wherein the plurality of instructions further comprise, for each packet received:

instructions that cause the data processor to read a VLAN ID of the received packet;

instructions that cause the data processor, if the VLAN ID of the received packet matches a VLAN ID of the first plurality of ports or the second plurality of ports, to determine whether the VLAN ID is assigned to the first system ID or the second system ID; if the VLAN ID is assigned to the first system ID, to determine an outgoing port for the packet based on the first physical path; and if the VLAN ID is assigned to the second system ID, to determine an outgoing port for the packet based on the second physical path; and instructions that cause the data processor, if the VLAN ID does not match a VLAN ID of the first plurality of ports and the second plurality of ports, to calculate a hash value of the VLAN ID of the packet and select an outgoing port from the distributed route information according to an order of the hash value based on a correlation between order of hash values and order of paths through the network fabric.

19. The non-transitory computer-readable storage medium according to claim 14, wherein the first logical group is assigned to the first system ID by correlating VNIs (VXLAN (Virtual eXtensible LAN) Network Identifiers) of the first plurality of ports in the first logical group with the first system ID; and wherein the second logical group is assigned to the second system ID by correlating VNIs of the second plurality of ports in the second logical group with the second system ID.

20. The non-transitory computer-readable storage medium according to claim 19, wherein the plurality of instructions further comprise, for each packet received:

instructions that cause the data processor to read a VNI of the received packet;

instructions that cause the data processor, if the VNI of the received packet matches a VNI of the first plurality of ports or the second plurality of ports, to determine whether the VNI is assigned to the first system ID or the second system ID; if the VNI is assigned to the first system ID, to determine an outgoing port for the packet based on the first physical path; and if the VNI is assigned to the second system ID, to determine an outgoing port for the packet based on the second physical path; and instructions that cause the data processor, if the VNI does not match a VNI of the first plurality of ports and the second plurality of ports, to calculate a hash value of the VNI of the packet and select an outgoing port from the distributed route information according to an order of the hash value based on a correlation between order of hash values and order of paths through the network fabric.

\* \* \* \* \*